US012579142B2

(12) United States Patent
Chen et al.

(10) Patent No.: US 12,579,142 B2
(45) Date of Patent: Mar. 17, 2026

(54) TECHNIQUES FOR JOINT CONTEXT QUERY REWRITE AND INTENT DETECTION

(71) Applicant: Adobe Inc., San Jose, CA (US)

(72) Inventors: Xiang Chen, San Jose, CA (US); Uttaran Bhattacharya, San Jose, CA (US); Tong Yu, San Jose, CA (US); Sungchul Kim, San Jose, CA (US); Said Kobeissi, San Jose, CA (US); Ryan Anthony Rossi, San Jose, CA (US); Ritwik Sinha, San Jose, CA (US); Razvan-Alexandru Balan, San Jose, CA (US); Prithvi Bhutani, San Jose, CA (US); Md Mehrab Tanjim, San Jose, CA (US); Jordan Walker, San Jose, CA (US); Brandon Galen Mooso, San Jose, CA (US); Andrei Zugravu, Bucharest (RO); Abhisek Trivedi, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/679,973

(22) Filed: May 31, 2024

(65) Prior Publication Data

US 2025/0371004 A1 Dec. 4, 2025

(51) Int. Cl.
*G06F 16/2453* (2019.01)
(52) U.S. Cl.
CPC .............................. *G06F 16/24542* (2019.01)

(58) Field of Classification Search
CPC ................................................. G06F 16/24542
See application file for complete search history.

(56) References Cited

U.S. PATENT DOCUMENTS

| | | | |
|---|---|---|---|
| 2004/0059726 A1* | 3/2004 | Hunter | G06F 16/3325 |
| 2021/0360109 A1* | 11/2021 | Rico Ródenas | H04M 3/5235 |
| 2022/0188304 A1* | 6/2022 | Samal | G10L 15/22 |
| 2022/0310070 A1* | 9/2022 | Moritz | G10L 15/28 |
| 2024/0256622 A1* | 8/2024 | Abrams | G06F 16/9538 |
| 2024/0378142 A1* | 11/2024 | Xhafa | G06F 11/3692 |
| 2024/0414017 A1* | 12/2024 | Lee | G06F 16/90332 |
| 2025/0005027 A1* | 1/2025 | Merchant | G06F 16/248 |

* cited by examiner

*Primary Examiner* — Jay A Morrison
(74) *Attorney, Agent, or Firm* — FIG. 1 Patents

(57) ABSTRACT

Artificial intelligence techniques for query management are described. A method comprises generating, by a context detection module, context information for a first query comprising natural language information to request a result from one of a plurality of machine learning models, modifying, by a query modification module, the first query based the context information to form a first modified query, determining, by an intent module, an intent type for the first modified query, selecting, by a routing module, a machine learning model from the plurality of machine learning models based on the intent type, and routing, by the routing module, the first modified query to the selected machine learning model. Other embodiments are described and claimed.

18 Claims, 17 Drawing Sheets

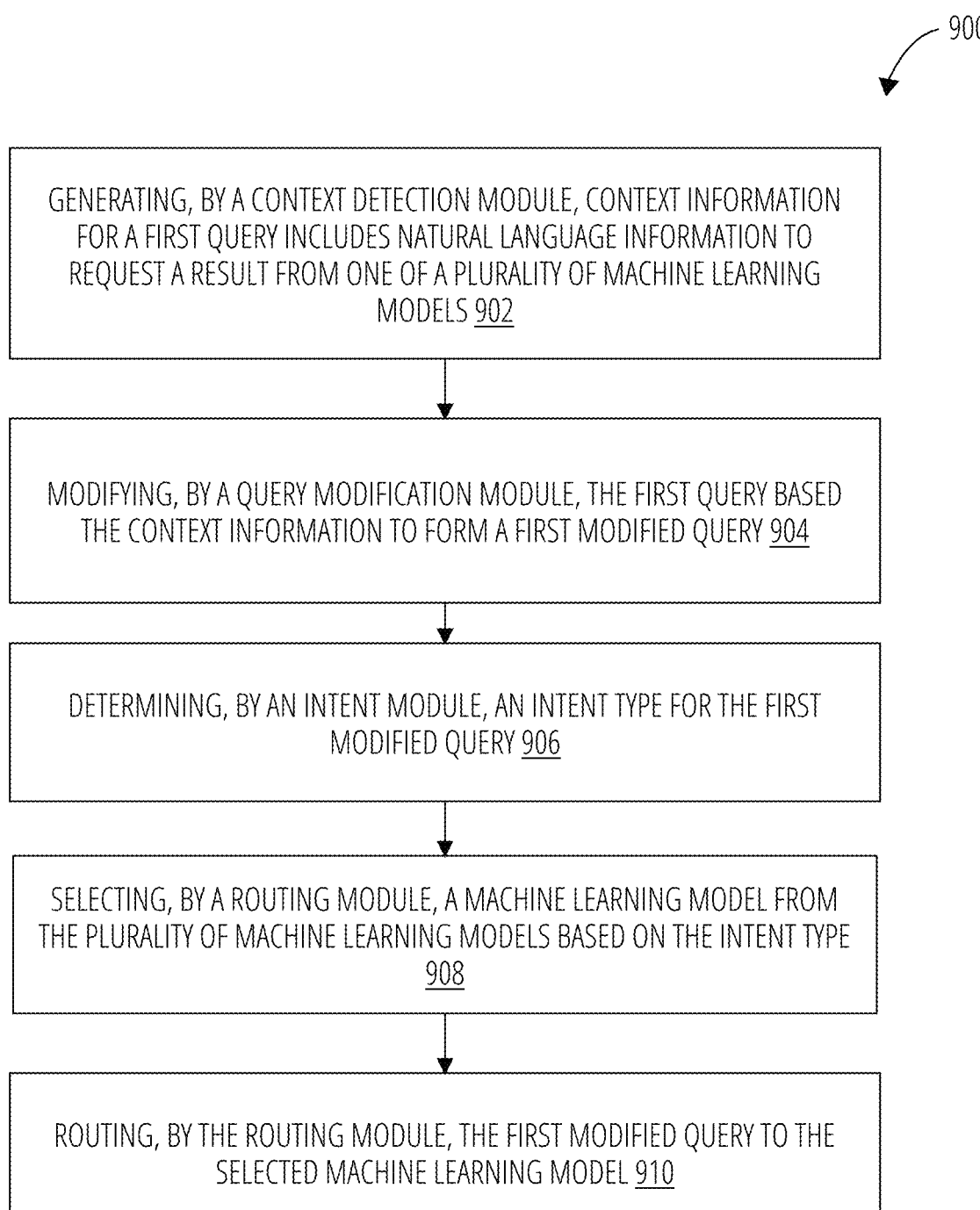

900

GENERATING, BY A CONTEXT DETECTION MODULE, CONTEXT INFORMATION FOR A FIRST QUERY INCLUDES NATURAL LANGUAGE INFORMATION TO REQUEST A RESULT FROM ONE OF A PLURALITY OF MACHINE LEARNING MODELS 902

MODIFYING, BY A QUERY MODIFICATION MODULE, THE FIRST QUERY BASED THE CONTEXT INFORMATION TO FORM A FIRST MODIFIED QUERY 904

DETERMINING, BY AN INTENT MODULE, AN INTENT TYPE FOR THE FIRST MODIFIED QUERY 906

SELECTING, BY A ROUTING MODULE, A MACHINE LEARNING MODEL FROM THE PLURALITY OF MACHINE LEARNING MODELS BASED ON THE INTENT TYPE 908

ROUTING, BY THE ROUTING MODULE, THE FIRST MODIFIED QUERY TO THE SELECTED MACHINE LEARNING MODEL 910

FIG. 9

1300
COMPUTER-READABLE STORAGE MEDIUM 1302
COMPUTER EXECUTABLE INSTRUCTIONS 1304
FIG. 13

TECHNIQUES FOR JOINT CONTEXT QUERY REWRITE AND INTENT DETECTION

BACKGROUND

A user often retrieves information from a machine learning model, such as a generative model or large language model (LLM), using a query. A query is a question or statement submitted to the model to retrieve a certain answer. Query transformation, such as query expansion, is a technique used in information retrieval and machine learning models to enhance the effectiveness of a search query. It involves reformulating an original query to include additional terms, with the goal of improving the retrieval of relevant information. In machine learning models, particularly those focused on natural language processing (NLP) and information retrieval, query expansion can play a role in understanding and processing queries more effectively. This is achieved by broadening or narrowing the scope of a query to allow the model to consider a wider variety of possible interpretations and contexts. In machine learning models, especially those applied to search and NLP tasks, query transformation can significantly improve a model ability to interpret and process natural language queries, leading to more accurate and relevant search results.

SUMMARY

Embodiments are generally directed to artificial intelligence (AI) techniques for efficiently and effectively retrieving results from a machine learning (ML) model. Some embodiments are particularly directed to prompt engineering techniques to generate a prompt or query for a ML model that includes context information. The context information includes context information from multiple queries. For example, the multiple queries include a current query and one or more previous queries. The one or more previous queries are summarized using a recursive summary technique. Further, some embodiments are particularly directed to analyzing queries for an intent to assist in routing queries to relevant ML models.

Some embodiments are particularly directed to an AI system using prompt engineering techniques to generate a customized query for different ML models. The customized query includes context information from multiple queries submitted over a query session. The multiple queries are summarized using a recursive summary technique that extracts context information from previous queries submitted during the query session. The summarized queries are then used for query modification of a new query submitted during the query session to form a modified query. The modified query is designed to produce more accurate results from an ML model. Further, the AI system applies prompt analysis techniques to the modified query in order to detect an intent for the modified query. The AI system then routes the modified query to one or more target ML models based on the detected intent. Consequently, the modified query is processed by an ML model that is designed to produce a more informative and accurate result for a user.

In one embodiment, for example, the AI system generates the context information in a recursive loop, where each iteration of the recursive loop summarizes context information from previous queries. For example, the AI system receives a query for a query session, extracts context information from the query, and generates a modified query. The AI system then receives a new query for the query session, extracts context information from the new query and the modified query, and generates a new modified query. This process continues in an iterative manner until the query session is terminated. For each iteration, context information from previous queries are summarized into a single query comprising semantically-rich context information from the entire query session. Consequently, an original query is augmented with additional terms or phrases to generate a modified query that is structured in a way to retrieve higher-quality results from a given ML model.

In one embodiment, for example, the AI system analyzes a modified query to detect an intent associated with the modified query. For example, the intent represents a type of results sought by the prompt generator, such as an automated system or a human user. The AI system uses the detected intent to identify a given ML model from a plurality of ML models that is suitable to process the modified query. Examples of intent types include without limitation visualization, forecasting, anomaly detection, data question and answer, breakdown dimension, segment creation, summary captioning, and other downstream tasks. In some cases, the AI system uses a combination of an ML model and rule-based logic for intent detection. The AI system then routes the modified query to an ML model designed to fulfill the intent of the query. For example, an intent for a text-to-text transformation is routed to an LLM, while an intent for a text-to-image transformation is routed to a generative adversarial network (GAN) or a variational auto-encoder (VAE).

Any of the above embodiments may be implemented as instructions stored on a non-transitory computer-readable storage medium and/or embodied as an apparatus with a memory and a processor configured to perform the actions described above. It is contemplated that these embodiments may be deployed individually to achieve improvements in resource requirements and library construction time. Alternatively, any of the embodiments may be used in combination with each other in order to achieve synergistic effects, some of which are noted above and elsewhere herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 9 illustrates a logic flow for an AI system in accordance with one embodiment.

FIG. 13 illustrates a computer-readable storage medium in accordance with one embodiment.

DETAILED DESCRIPTION

Figure 1:
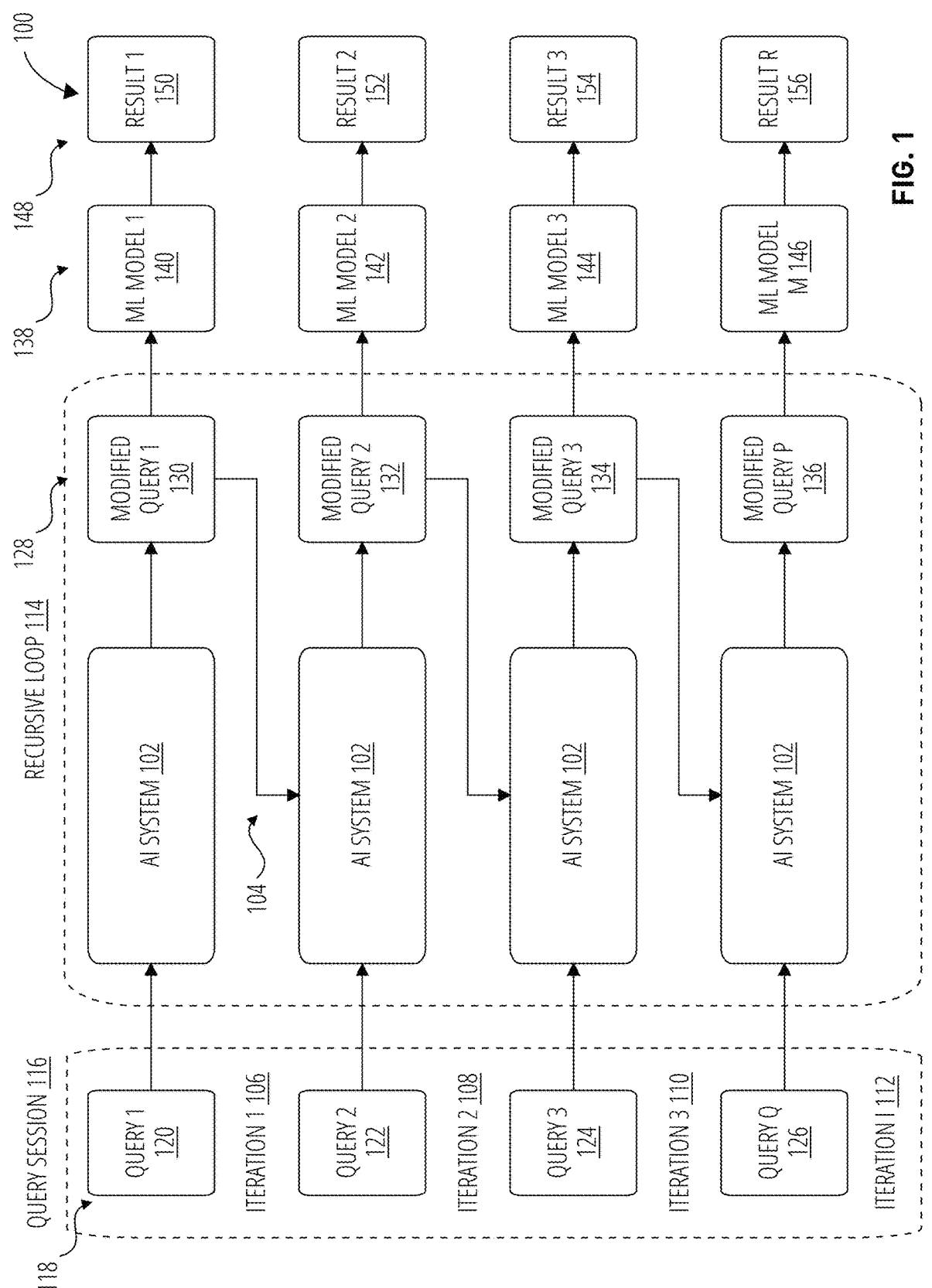
FIG. 1 illustrates a logic diagram for an AI system in accordance with one embodiment.

Embodiments are generally directed to artificial intelligence (AI) techniques for efficiently and effectively retrieving results from a machine learning (ML) model. Some embodiments are particularly directed to prompt engineering techniques to generate a prompt for a ML model that includes context information. The context information includes context information from multiple queries. For example, the multiple queries include a current query and one or more previous queries. The one or more previous queries are summarized using a recursive summary technique. Further, some embodiments are particularly directed to analyzing queries for an intent to assist in routing queries to relevant ML models. Although exemplary embodiments are described in connection with a particular AI system or ML model, the principles described herein can also be applied to other types of machine learning systems as well. Embodiments are not limited in this context.

Prompt engineering in machine learning refers to the process of designing and refining inputs, such as prompts or queries, in a way that effectively guides a machine learning model, especially language models, to generate desired outputs or responses for information retrieval, searches, or other tasks. This technique is particularly relevant with large language models (LLMs) such as Generative Pre-trained Transformer (GPT) versions, where the quality and specificity of the prompt can significantly influence the accuracy, relevance, and quality of the model output. Prompt engineering involves crafting prompts that are clear, contextually rich, and structured in a way that leverages model capabilities to perform tasks like text generation, answering questions, summarization, translation, routing, and more.

One prompt engineering technique is referred to as query expansion. Query expansion in machine learning, particularly within the context of information retrieval and natural language processing (NLP), refers to the technique of augmenting an original search query with additional terms or phrases to improve the retrieval quality of search results. This is done to overcome the limitations of the original query, which might be too narrow or ambiguously worded, leading to missing relevant documents or information. Query expansion can involve several techniques, including: (1) synonym expansion by adding synonyms of the words in the original query to capture more documents that use different terms for the same concept; (2) stemming and lemmatization by including different morphological variations of the words in the query to match more documents; (3) semantic expansion by incorporating words that are semantically related to the terms in the original query, based on understanding of the context and meaning, rather than just syntactic variations; (4) using external knowledge bases by expanding queries using related terms or concepts found in external knowledge bases or ontologies, such as WordNet for English language; (5) user behavior data by analyzing logs of user queries and clicks to identify related terms or phrases that have previously led to successful outcomes; and (6) feedback loops by employing relevance feedback (either explicit, by user selection, or implicit, derived from user behavior) to refine and expand queries based on which results are deemed relevant. Query expansion aims to increase the recall of a search (e.g., the proportion of all relevant documents that are retrieved), often at the potential cost of reducing precision (e.g., the proportion of retrieved documents that are relevant). It is a trade-off that systems need to balance, usually with the help of machine learning algorithms that can learn the most effective expansion techniques based on the specifics of the datasets, the domain, and user search behavior.

Current prompt engineering techniques, such as query expansion, face several challenges for modern day systems. For example, query expansion typically involves use of a ML model for rewriting a query in a sequential manner, solving one task at a time before moving on to the next task. This sequential approach increases latency for query rewrites, monetary costs, and computational costs. In another example, query expansion typically requires significant amounts of training data for each of these tasks. Furthermore, query expansion is not flexible since the ML model needs retraining for every new task. It takes significant effort and time to make even minor updates to these models.

Embodiments solve these and other challenges using novel AI techniques for generating prompts that are designed to efficiently and effectively retrieve results from one or more ML models. Some embodiments are particularly directed to an AI system using prompt engineering techniques to generate a customized query for different ML models. The customized query includes context information from multiple queries submitted over a query session. The multiple queries are summarized using a recursive summary technique that extracts context information from previous queries submitted during the query session. The summarized queries are then used for query modification of a new query submitted during the query session to form a modified query. The modified query is designed to produce more accurate results from an ML model. Further, the AI system applies prompt analysis techniques to the modified query in order to detect an intent for the modified query. The AI system then routes the modified query to one or more target ML models based on the detected intent. Consequently, the modified query is processed by an ML model that is designed to produce a more informative and accurate result for a user.

In one embodiment, for example, the AI system generates the context information in a recursive loop, where each iteration of the recursive loop summarizes context information from previous queries. For example, the AI system receives a query for a query session, extracts context information from the query, and generates a modified query. The AI system then receives a new query for the query session, extracts context information from the new query and the modified query, and generates a new modified query. This process continues in an iterative manner until the query session is terminated. For each iteration, context information from previous queries are summarized into a single query comprising semantically-rich context information from the entire query session. Consequently, an original query is augmented with additional terms or phrases to generate a modified query that is structured in a way to retrieve higher-quality results from a given ML model.

In one embodiment, for example, the AI system analyzes a modified query to detect an intent associated with the modified query. For example, the intent represents a type of results sought by the prompt generator, such as an automated system or a human user. The AI system uses the detected intent to identify a given ML model from a plurality of ML models that is suitable to process the modified query. Examples of intent types include without limitation visualization, forecasting, anomaly detection, data question and answer, breakdown dimension, segment creation, summary captioning, and other downstream tasks. In some cases, the AI system uses a combination of an ML model and rule-based logic for intent detection. The AI system then routes the modified query to an ML model designed to fulfill the intent of the query. For example, an intent for a text-to-text transformation is routed to an LLM, while an intent for a text-to-image transformation is routed to a generative adversarial network (GAN) or a variational auto-encoder (VAE).

Embodiments provide a number of advantageous technical purposes and technical implementations. The embodiments implement an approach that does not require large amounts of labeled data for any of these tasks, while being extremely flexible, easy-to-use, accurate, fast, and cost-effective. For example, some embodiments use a recursive summary technique of context information from previous queries for a query session that accelerates query rewrites relative to sequential approaches. This decreases latency for query generation, saving compute and memory resources, while increasing accuracy to obtain a target set of results. Further, some embodiments use an intent detection technique that routes queries to suitable ML models for processing the queries. This makes efficient use of ML models, thereby saving compute, memory and communication bandwidth resources. In addition, the AI system uses a combination of an ML model and rule-based logic to enhance intent detection speed and accuracy. This reduces or eliminates routing queries to ML models incapable of processing the queries, or inefficient at processing the queries, thereby conserving use of the ML models and associated technical resources for other tasks. Further, the AI system uses less training data to train ML models for query generation and/or intent generation by leveraging a few-shot learning approach supplemented by intent definitions and rule-based logic. Other technical purposes and implementations exist as well. Embodiments are not limited to these examples.

As used herein, the term "artificial intelligence" refers to a branch of computer science dedicated to creating systems capable of performing tasks that would typically require human intelligence. These tasks include reasoning, learning from data, recognizing patterns, understanding language, and making decisions. AI systems are designed to emulate complex cognitive processes through various approaches, such as machine learning, deep learning, natural language processing, and expert systems. One purpose of AI research is to develop technology that can perform tasks with autonomy, adaptability, and intelligence comparable to or surpassing human capabilities.

As used herein, the term "model" refers to a mathematical representation of a real-world process learned from data. It is the output generated when a machine learning algorithm is trained with data, transforming input variables into a predicted output. The model learns from the training data, identifying patterns or making decisions based on its learning to predict outcomes for unseen data. Machine learning models can vary in complexity and type, including linear models for regression or classification, decision trees, support vector machines, and neural networks, among others. The effectiveness of a model is often evaluated based on its accuracy, precision, recall, and ability to generalize to new, unseen data.

As used herein, the term "prompt engineering" refers to a technique in machine learning, particularly within the context of natural language processing (NLP) and Large Language Models (LLMs), where the design, formulation, and optimization of textual prompts are used to effectively extract desired behaviors or responses from a model. It involves crafting the input text or question in a way that guides the model to understand the task at hand and to generate more accurate, relevant, or creative outputs. Prompt engineering can range from simple adjustments, like rephrasing questions or adding specific instruction to the prompt, to more complex strategies that involve conditioning the model with examples (e.g., few-shot learning), or chaining multiple prompts to achieve a desired outcome. This practice is relevant for applications of generative AI interfaces, conversational agents, and any task requiring nuanced or context-aware machine-generated text. The skillful design of prompts can significantly impact the performance of AI models, making prompt engineering a key area of exploration for maximizing the utility and effectiveness of NLP technologies.

As used herein, the term "query" refers to a question, prompt, or request made to a ML model or ML algorithm to obtain specific information or a prediction based on given input. For example, in the context of an LLM, a query may comprise a question or request for information from the LLM in a natural language. In another example, in supervised learning, a query could involve presenting a new piece of data to a trained model to predict its label or outcome. In active learning, a query might represent the selection of specific instances from an unlabeled dataset for which the model is uncertain of their labels, and thus, requests these labels from an oracle or human expert to learn more efficiently. Queries are used for retrieving knowledge, making predictions, and improving models through iterative learning.

As used herein, the term "query session" refers to a continuous or sequential interaction between a client device and an ML model, such as an LLM, where the user submits queries via the client device and the LLM generates responses based on its trained knowledge base. This process can involve single or multiple queries related by context or content, allowing for a conversational exchange that can clarify, expand upon, or explore various topics. Query sessions with LLMs can be used for information retrieval, conversation, generating textual content, problem-solving, and educational purposes, among other applications. The LLM maintains context over the session to provide relevant and coherent responses to the queries.

As used herein, the term "context information" refers to any additional, relevant data or background information provided to a model that helps it make more accurate predictions or decisions. This context can significantly affect the interpretation of input data and the resultant outputs. For example, in natural language processing, the context could include preceding sentences or paragraphs that clarify the meaning of current text. In recommendation systems, context might include the time of day, user location, or previous user interactions. Incorporating context information into a model's training and inference processes allows it to better understand the nuances of the data, leading to more precise and meaningful outcomes.

As used herein, the term "intent" refers to an underlying goal or purpose that a user aims to achieve by making a query. Identifying the intent is important for systems designed to interact with users, such as chatbots, voice assistants, and search engines, as it enables the system to provide more accurate and relevant responses or actions. For instance, in a conversational AI system, if a user asks, "What's the weather like in Paris today?" the intent behind this query is identified as seeking weather information. Understanding this intent allows the system to not only fetch the appropriate weather data but also to frame it in a manner that is most useful to the user. Machine learning models are trained on large datasets with labeled examples of queries and their corresponding intents to accurately predict the intent of new, unseen queries. This process involves techniques such as natural language processing to understand the semantics of the query and classification algorithms to assign the correct intent based on the learned patterns.

As used herein, the term "few-shot learning" refers to a machine learning approach designed to enable models to learn effectively from a very small amount of labeled data. Traditional machine learning models typically require large datasets to learn and generalize well. However, in many real-world scenarios, gathering extensive labeled data can be impractical or too expensive. Few-shot learning aims to overcome this challenge by developing algorithms that can adapt to new tasks or recognize new classes with just a few examples, often as little as one to five training samples per class. There are several techniques used in few-shot learning, including: meta-learning for training a model on a variety of tasks so it can quickly adapt to new tasks with minimal data; transfer learning that leverages knowledge learned from related tasks with abundant data to improve learning efficiency on new tasks with scant data; or hallucination techniques that generate artificial data based on the few existing samples to augment the training set. Few-shot learning is particularly relevant in fields where collecting large annotated datasets can be challenging, or in natural language processing tasks with niche applications that lack large corpora.

FIG. 1 is a logic diagram 100 representing operations for an AI system 102. The AI system 102 comprises an exemplary electronic system suitable for implementing various AI techniques using one or more ML models as described herein. The AI system 102 processes a set of queries 118 for a query session 116 in an iterative manner. As used herein, the variables I, M, Q, P, R and S represent any positive integer.

In general, the AI system 102 is a system designed for jointly detecting and generating whether additional context is required for a given question or follow-up question to an ML model, the generated rewritten query if required, and the intent of that generated query. The approach can be leveraged alongside any generative model. The AI system 102 combines multiple tasks into a single response that leverages the chained responses. As an example, the AI system 102 receives a query, then decides whether it can be answered directly, or if it requires additional context. If it requires additional context, then it uses the previous question, which can be a summarized or rewritten query up to k steps, to generate a rewritten short query that contains the information in the current query along with the previous context required to effectively answer it. The AI system 102 then leverages this to infer the intent of the query or generated query.

The AI system 102 implements an approach that is shown to be highly effective, achieving an accuracy of 88% and 92% with a runtime that takes 300-400 milliseconds. The recursive approach for rewriting a query that recursively takes the previous query, which after the first recursion will be the rewritten query, and the current query, and then formulates a new query that succinctly summaries both. This approach is both an efficient and accurate way of encoding all the relevant details. The context detection and query rewriting naturally enables the conversational chat interface desired in many AI systems 102, since it enables the context to be included in a user's questions when needed through rewriting it. These components also are shown to improve intent detection by helping to clarify the actual user intent when unclear from the user's question.

The AI system 102 is well-suited for applications that do not have a labeled data (e.g., large set of examples for each intent) for training or fine-tuning purposes. The approach is also accurate, fast taking only a small fraction of a second to solve 3 tasks jointly (300-400 ms per question on average), does not require any labeled data, and is cost-effective, and extremely flexible as new intents can be quickly included.

As depicted in FIG. 1, the logic diagram 100 illustrates a multiple iterations 104 of the AI system 102 for a query session 116. The query session 116 comprises one or more queries 118 including query 1 120, query 2 122, query 3 124, and query Q 126. The AI system 102 processes each of the queries 118 in a series of iterations 104 including iteration 1 106, iteration 2 108, iteration 3 110, and iteration 1 112. During each of the iterations 104 of the recursive loop 114, the AI system 102 produces a modified query P that includes content information from a query Q that is used as input for a subsequent iteration of the AI system 102 in a recursive manner. As a result, the modified query P represents a summary of all relevant context information from previous queries Q of the query session 116. In this context, the modified query P may also be referred to herein as a summarized query S.

By way of example, for each of the iterations 104, the AI system 102 generates a set of modified queries 128 based on context information from the queries 118 and one or more modified queries 128 using a recursive loop 114. The modified queries 128 include modified query 1 130, modified query 2 132, modified query 3 134, and modified query P 136 corresponding to 120, query 2 122, query 3 124, and query Q 126, respectively. The AI system 102 routes the modified queries 128 to one or more ML models 138 based on, at least in part, an intent type associated with the modified queries 128. The ML models 138 include ML model 1 140, ML model 2 142, ML model 3 144, and ML model M 146. Each of the ML models 138 is a machine learning model that is trained to provide a different service or performs a different task. The ML models 138 process each of the modified queries 128 to produce a set of results 148 including result 1 150, result 2 152, result 3 154, and result R 156 based on the modified query 1 130, modified query 2 132, modified query 3 134, and modified query P 136, respectively. This process continues until the query session 116 is terminated or reaches a stopping condition.

For example, in an iteration 1 106 of a query session 116, an AI system 102 receives a query 1 120, generates context information for the query 1 120, and generates modified query 1 130 using the context information. Since the query 1 120 is a first query of the query session 116, the context information is limited to the query 1 120 since there are no previous queries in the query session 116. In some cases, the query 1 120 and the modified query 1 130 may be the same. The AI system 102 determines an intent type for the modified query 1 130, and it uses the intent type to route the modified query 1 130 to the ML model 1 140 to generate a result 1 150.

In an iteration 2 108 of the query session 116, the AI system 102 receives a query 2 122, generates context information for the query 2 122 and the modified query 1 130, and generates a modified query 2 132 using the context information. Since the query 2 122 is the second query of the query session 116, the AI system 102 uses additional context information from a previous query of the query session 116, which in this case is the modified query 1 130 of the first iteration 1 106. The modified query 1 130 summarizes the context information from the query 1 120. The AI system 102 determines an intent type for the modified query 2 132, and it uses the intent type to route the modified query 2 132 to the ML model 2 142 to generate a result 2 152.

In an iteration 3 110, the AI system 102 receives a query 3 124, generates context information for the query 3 124 and the modified query 2 132, and generates a modified query 3 134 using the context information. Since the query 3 124 is the third query of the query session 116, the AI system 102 uses additional context information from multiple previous queries of the query session 116, which in this case is contained within the modified query 2 132 of the second iteration 2 108. The modified query 2 132 summarizes the context information from the query 1 120 and the query 2 122. The AI system 102 determines an intent type for the modified query 3 134, and it uses the intent type to route the modified query 3 134 to the ML model 3 144 to generate a result 3 154.

This process continues in a recursive loop 114 for Q queries and P modified queries for a number of iterations/ until the query session 116 is terminated. Each of the iterations 104 continuously builds a modified query P that comprises another layer of context information summarized from previous queries for the query session 116. In one embodiment, for example, every modified query P of a current iteration comprises context information from a previous modified query P−1 of a previous iteration, which the AI system 102 uses to provide context to a new query Q for the current iteration of the query session 116.

It is worthy to note that although each iteration of the iterations 104 has a single ML model M of the ML models 138 that correspond to a modified query P of the modified queries 128, it may be appreciated the AI system 102 routes the modified query P to any of the ML models 138 or multiple ML models 138 suitable to process the modified query P. This process is described in further detail with reference to FIG. 2.

Figure 2A:
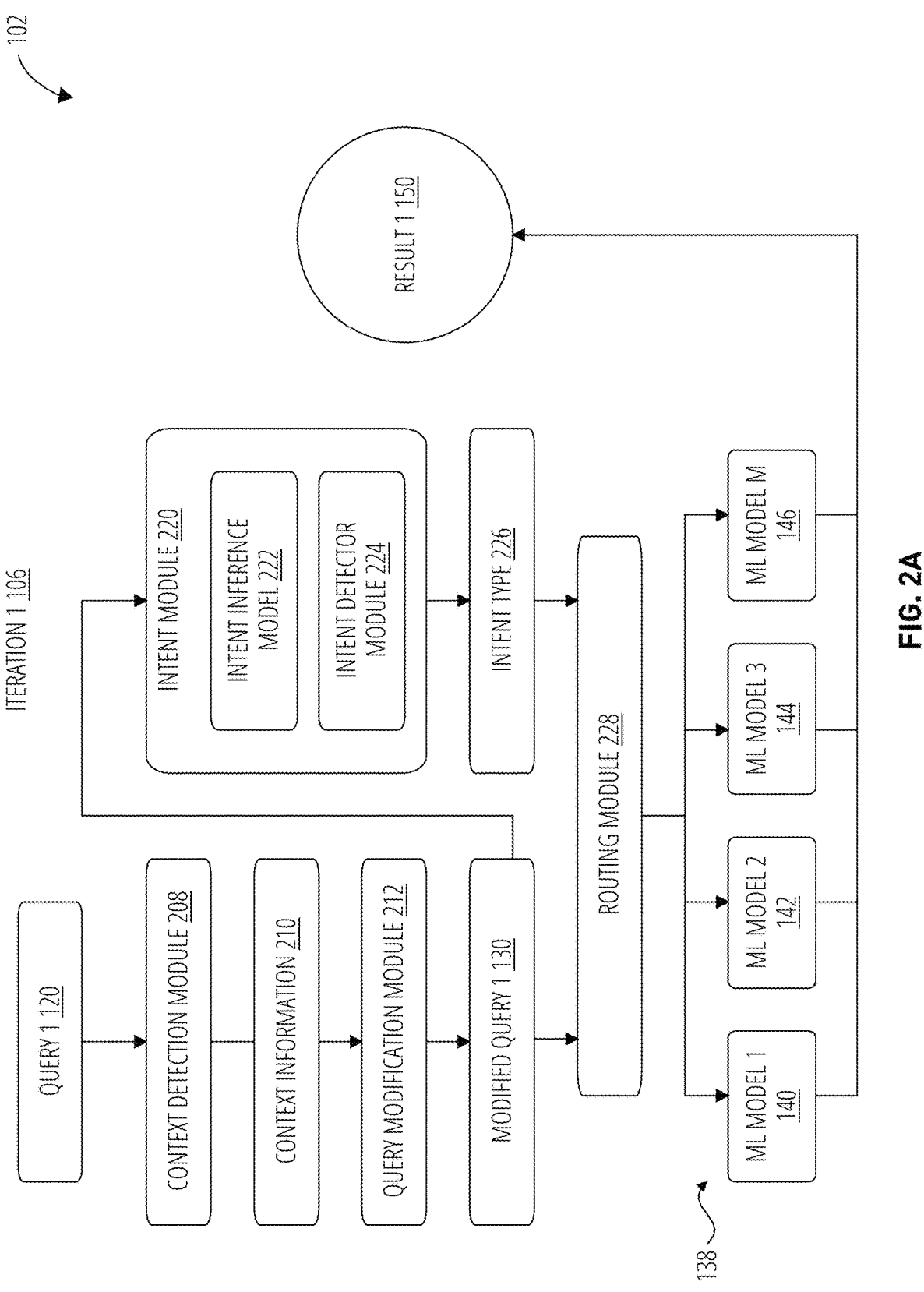
FIG. 2A illustrates an architecture for an AI system in accordance with one embodiment.

FIG. 2A illustrates an example architecture for the AI system 102. FIG. 2A illustrates a first iteration 1 106 for a query session 116 starting with an initial query 1 120 to produce an initial result 1 150.

As depicted in FIG. 2A, a context detection module 208 receives as input a query 1 120. The query 1 120 is a question, prompt, or request made to an ML model or an ML algorithm to obtain specific information or a prediction based on given input. For example, in the context of an LLM, a query 1 120 may comprise a question or request for information from the LLM in a natural language suitable for natural language processing (NLP) by the context detection module 208.

The context detection module 208 retrieves context information 210 from the query 1 120 or associated with the query 1 120. The context detection module 208 receives the query 1 120 from the user or an automated prompt generation system. The query 1 120 is the primary input that the user expects the AI system 200 to understand and process. The context detection module 208 performs a preliminary analysis of the query 1 120 to extract its key components, such as keywords, entities, and action items. This operation involves natural language processing techniques to understand the semantics of the query 1 120. The context detection module 208 identifies a type of context needed to process the query 1 120 effectively. In future iterations, the context detection module 208 extracts context information 210 from future queries 118 and previous modified queries 128, as discussed in more detail with reference to FIG. 2B.

The context detection module 208 receives a query 1 120 from the user and generates context information 210 for the query 1 120. The context information 210 comprises any additional, relevant data or background information provided to an ML model that helps it make more accurate predictions or decisions. The context information 210 can significantly affect the interpretation of input data and the resultant outputs. For example, in natural language processing, the context information 210 could include preceding words, sentences or paragraphs that clarify the meaning of current text. In recommendation systems, context information 210 might include the time of day, user location, or previous user interactions. Incorporating context information 210 into a model training and inference processes allows it to better understand the nuances of the data, leading to more precise and meaningful outcomes. For example, the context information 210 can be temporal (time-related), spatial (location-related), linguistic (related to the language or conversational history), or personal (user preferences or previous interactions). Based on the identified context type, the context detection module 208 retrieves relevant context information 210. This may involve accessing user data or profiles for personal context, referencing recent interactions or the current conversation for conversational context, utilizing external databases or knowledge bases for additional information that provides background or clarification, and so forth. The context detection module 208 outputs the context information 210 to a query modification module 212.

The query modification module 212 receives as input the context information 210. The query modification module 212 is designed to integrate the retrieved context information 210 with the original query 1 120 to form a modified query 1 130. The modified query 1 130 is an augmented query that contains both the explicit request from the query 1 120 and the inferred needs or conditions based on the context information 210.

In one embodiment, for example, the query modification module 212 uses prompt engineering techniques to transform a current query into a transformed query, such as the query 1 120 into a modified query 1 130, for example. This process enhances a clarity, preciseness, and relevance of the original query 1 120, thereby improving the resulting output from an ML model 1 140. The query modification module 212 transforms the query 1 120 to a modified query 1 130 using the context information 210. For example, in a conversational AI system, assume the query 1 120 is a sentence such as "compare monthly revenue by state." Further assume the context information 210 includes geographic information that places the user that submitted the query 1 120 in the United States. The query modification module 212 can include instructions to perform query expansion, such as "compare monthly revenue by state within the United States." The query modification module 212 can also include instructions to complete any missing information, such as temporal information, transforming the query to "compare monthly revenue by state within the United States for the last three full months." Embodiments are not limited to this example.

The query modification module 212 analyzes the query 1 120 to understand its intent and identify any ambiguous, vague, or missing information that could hinder the retrieval of accurate responses. NLP techniques are employed to dissect a structure and content of the query 1 120. Based on the analysis, the query modification module 212 determines the needs for transforming the query 1 120. This could involve clarifying query intent, specifying additional details, or reformulating the query for better comprehension by an ML model 1 140. The query modification module 212 applies prompt engineering strategies, such as query expansion, to transform the query 1 120. This could involve adding more context or details to make the query more comprehensive, changing the wording to reduce ambiguity and align better with the model's training, including examples or templates in the query 1 120 to guide response generation of an ML model 1 140, adding instructions specifying a desired response format or guiding an ML model 1 140 on how to approach the query 1 120, and other prompt engineering techniques. The query modification module 212 outputs the modified query 1 130 to a routing module 228 and to an intent module 220.

In some embodiments, the query modification module 212 makes an initial threshold determination as to whether it should transform a query into a modified query. For instance, the query modification module 212 analyzes a query to determine that there is insufficient context information 210 to meaningfully modify the query 1 120, or that the query 1 120 is sufficiently clear and understandable in its current form and therefore it does not need further modification. For example, one source of context information 210 is from previous queries of the query session 116. Since the query 1 120 is the first query in the query session 116, however, there are no previous queries of the query session 116. In another example, the query 1 120 may have a sufficient length using alternate terms that are descriptive enough to elicit an accurate response from a ML model. In such cases, the query modification module 212 may pass the query 1 120 as the modified query 1 130 without any changes. In other words, the query 1 120 and the modified query 1 130 are identical. The query modification module 212 outputs the modified query 1 130 to the routing module 228 and to the intent module 220.

The intent module 220 receives as input the query 1 120 and/or the modified query 1 130. The intent module 220 detects an intent type 226 from the query 1 120 and/or the modified query 1 130. The intent type 226 describes a type of an intent associated with the query 1 120 and/or the modified query 1 130. Generally, the term "intent" refers to an underlying goal or purpose that a user aims to achieve by making a query 1 120. For instance, in a conversational AI system, assume the query 1 120 is a sentence such as "compare monthly revenue by country." In this case, the intent type 226 behind this query is identified as seeking financial information. There are many different intent types 226 defined for the intent module 220.

The intent module 220 may identify an intent type 226 for the modified query 1 130 using two different techniques. In one embodiment, the intent module 220 uses an intent inference model 222 to generate the intent type 226. In one embodiment, the intent module 220 uses an intent detector module 224 to generate the intent type 226. In one embodiment, the intent module 220 uses a combination of the intent inference model 222 and the intent detector module 224 to generate the intent type 226. The intent module 220 outputs the intent type 226 for the modified query 1 130 to the routing module 228.

In one embodiment, the intent module 220 uses an intent inference model 222 to generate the intent type 226. The intent inference model 222 is a machine learning model designed for the accurate prediction of the intent behind queries or prompts. This model utilizes a combination of NLP techniques, deep learning algorithms, and a comprehensive training dataset to understand and interpret human language, thus classifying the underlying intent accurately. The intent prediction model can be applied to various fields such as search engines, customer service bots, voice-activated personal assistants, and other interactive applications to enhance user experience by providing more relevant responses and actions based on the interpreted intent. The intent inference model 222 leverages advanced NLP and deep learning frameworks to analyze and predict the intent behind text-based queries or prompts. The objective is to enable applications, such as ML models 138, to respond in a more contextually relevant manner, thus improving the effectiveness of automated systems in interpreting human requests.

The intent inference model 222 has an architecture that integrates an input preprocessing module, a deep learning-based analysis engine, and an intent classification layer. The input preprocessing module is responsible for cleaning and preparing query data for analysis. It performs tasks such as tokenization, normalization, and potentially removing stop words, making the input data more suitable for model processing. The deep learning-based analysis engine is a deep learning engine, which may employ recurrent neural networks (RNNs), specifically long short-term memory (LSTM) networks or transformers, to understand the context and semantics of the input query 1 120. This engine is capable of capturing complex language patterns and relationships within the text. An intent classification layer applies a classification algorithm to the features extracted by the deep learning engine to predict the intent type 226 or category of the query 1 120. This layer can utilize various classification techniques, including SoftMax regression, to assign probability scores across a pre-defined set of intent categories. The intent inference model 222 is trained on a diverse dataset comprising samples of queries or prompts annotated with their corresponding intents. This dataset includes a wide range of languages, dialects, and domains to ensure robustness and accuracy. The training process involves fine-tuning the deep learning parameters and optimizing the classification layer to accurately interpret and predict the intents. Once trained, the intent inference model 222 is implemented across various platforms and applications to perform inferencing operations that significantly enhance user interaction by providing more relevant and precise responses based on the interpreted intent.

In one embodiment, the intent module 220 uses an intent detector module 224 to generate the intent type 226. Similar to the intent inference model 222, the intent detector module 224 receives the modified query 1 130 and interprets its intent type 226. Unlike the intent inference model 222, the intent detector module 224 is a rules-based set of logic or code. The intent detector module 224 accesses a set of intent definitions corresponding to different intent types 226 from a data structure, such as a look-up table. The intent detector module 224 then uses a set of rules that compare the intent definitions to the modified query 1 130, and attempts to find a match. When a match is found, the intent detector module 224 retrieves the corresponding intent type 226, and it outputs it to the routing module 228.

In one embodiment, the intent module 220 uses a combination of the intent inference model 222 and the intent detector module 224 to generate the intent type 226. Both the intent inference model 222 and the intent detector module 224 process the modified query 1 130 to detect an intent type 226. The output from the intent inference model 222 and the intent detector module 224 is compared. If there is a match, the intent module 220 outputs the intent type 226. If there is not a match, the intent inference model 222 and the intent detector module 224 modifies the input from the modified query 1 130 slightly and re-processes the modified query 1 130 to determine intent type 226. This process continues until the intent inference model 222 and the intent detector module 224 converge on an intent type 226. In one embodiment, the intent inference model 222 and the intent detector module 224 can operate in sequence, where the output of the intent inference model 222 is used as an input to the intent detector module 224, or vice-versa. This architecture may increase accuracy at the cost of increased processing or inferencing time. In one embodiment, the intent inference model 222 and the intent detector module 224 can operate in parallel. This architecture may decrease processing or inferencing time at the cost of accuracy.

The routing module 228 receives two inputs comprising the modified query 1 130 and the intent type 226 for the modified query 1 130. The routing module 228 selects an ML model M 146 from the ML models 138 that is suitable to process the modified query 214 based on the intent type 226 and capabilities of the ML model 420. For example, assume the AI system 200 implements or has access to four ML models 138 including ML model 1 140, ML model 2 142, ML model 3 144, and ML model M 146. Further assume that the ML models 138 are different types of ML models as defined by a set of parameters defining operational capabilities for the ML models 138. For example, each of the ML models 138 have specialized architectures designed to excel at different tasks, including text generation, video generation, audio generation, and more. The routing module 228 compares the intent type 226 with the operational capabilities for each ML model M 146, selects an ML model M 146 that matches the operational capabilities, and routes the modified query 1 130 to one of the selected ML models 138, such as ML model 1 140, for example.

Each of the ML models 138 have specialized architectures designed to excel at different tasks, including text generation, video generation, audio generation, and more. Examples of ML models 138 tailored for specific tasks include without limitation: (1) text generation using NLP such as GPT version 3 and beyond to generate human-like text based on the input prompt; (2) search such as Bidirectional Encoder Representations from Transformers (BERT) for understanding the context of words in search queries, making it useful for search engines, question-answering systems, and language inference tasks; (3) video generation such as First Order Motion Model for Image Animation that can animate portraits in videos using a single image, Vector Quantized Variational Autoencoders stage 2 (VQ-VAE-2) which is a model capable of generating high-quality videos that learns to compress videos into a lower-dimensional representation and then learns to generate videos from this compressed representation; (4) audio generation such as WaveNet which is a deep neural network for generating raw audio waveforms for generating realistic speech and music, or Jukebox which is a generative model that can create music, including singing, in various styles and genres; (5) image generation such as Style Generative Adversarial Network 2 (StyleGAN2) for generating high-resolution and highly realistic images such as creating artificial faces, art, and enhancing photo-realism or Deep Convolutional Generative Adversarial Network (DCGAN) which specializes in generating new images from a training set, useful for art creation, photo editing, and game development; and (6) speech recognition such as DeepSpeech which is an open-source speech recognition model that can convert spoken words into text which is useful for voice user interfaces, transcription services, and assistive technologies. Embodiments are not limited to these examples.

Once the routing module 228 selects and routes the modified query 1 130 to one or more of the ML models 138, the selected ML model processes the modified query 1 130 to produce a result 1 150. The modified query 1 130, which is a transformed version of the query 1 120, further engineered through prompt strategies, is prepared as the new input for the selected ML model. The AI system 102 interacts with the appropriate model, feeding it the engineered prompt. The ML model, trained on vast data and possibly fine-tuned for specific tasks, processes the modified query 1 130 to generate the result 1 150 based on the transformed query. The engineered prompt helps in eliciting a more accurate, relevant, and useful output that aligns with the user's original intent and newly specified context. Optionally, the AI system 102 can evaluate the effectiveness of the transformed query and the quality of the result 1 150. Feedback from this evaluation can be used to refine prompt engineering strategies for future queries. By transforming the query 1 120, the AI system 102 improves its understanding and alignment with the user's intent, leading to better outcomes and higher user satisfaction.

Figure 2B:
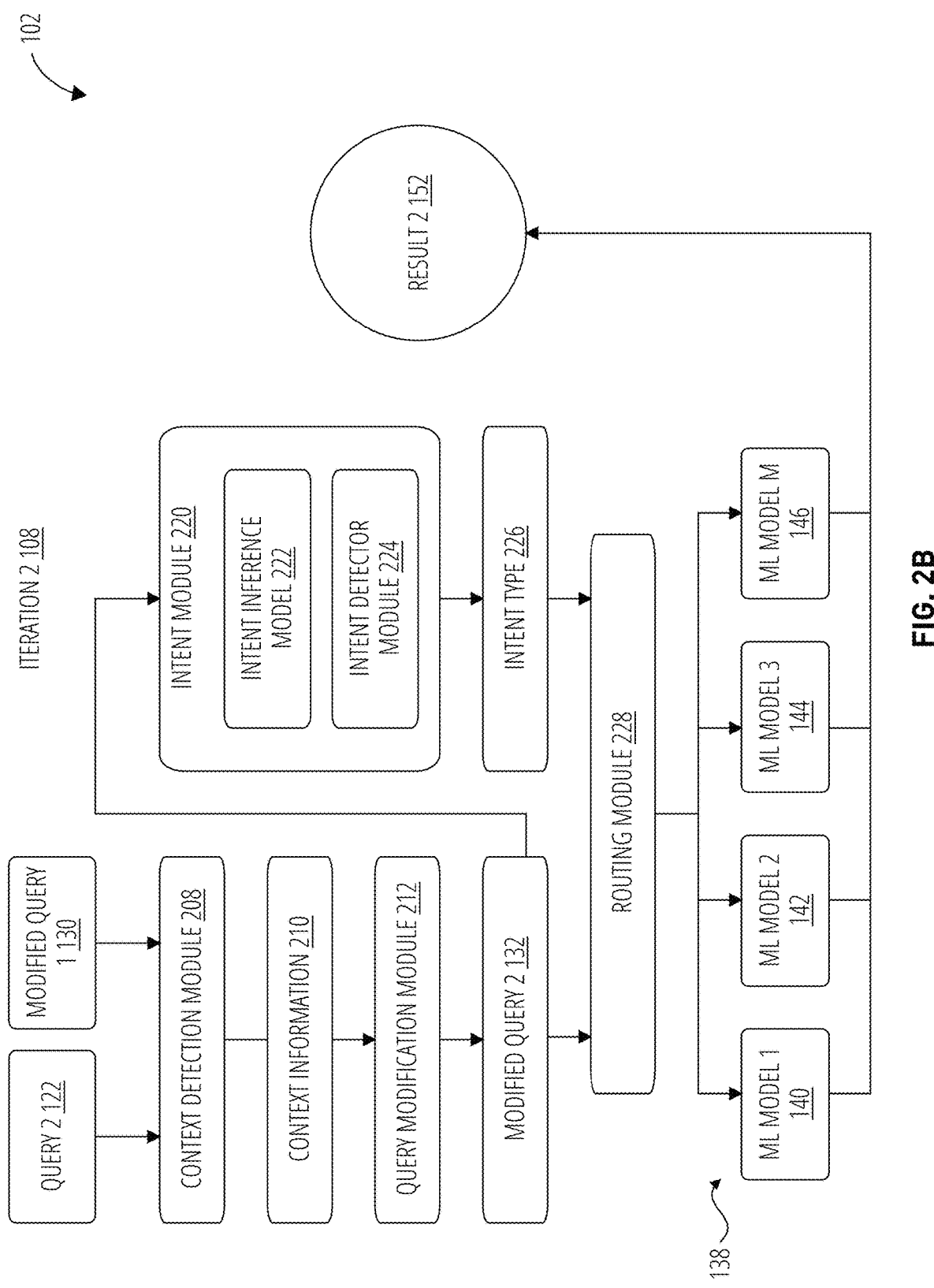
FIG. 2B illustrates an architecture for an AI system in accordance with one embodiment.

FIG. 2B illustrates an example architecture for the AI system 102. FIG. 2B illustrates a second iteration 2 108 for a query session 116 starting with a second query 2 122 to produce a second result 2 152. The operations of iteration 2 108 are similar to those of iteration 1 106. However, instead of the context detection module 208 receiving a single input of query 1 120, the context detection module 208 receives two inputs including the second query 2 122 of the query session 116 and the modified query 1 130 generated during iteration 1 106.

In iteration 2 108, the context detection module 208 detects, extracts, or generates context information 210 from both the query 2 122 and modified query 1 130. The modified query 1 130 comprises context information 210 from the query 1 120 of the first iteration 1 106. As a result, the modified query 1 130 represents a summary or accumulation of context information from a previous query, which in this case is query 1 120. The AI system 102 then processes the context information 210 in a manner similar to iteration 1 106 to produce the result 2 152.

Figure 2C:
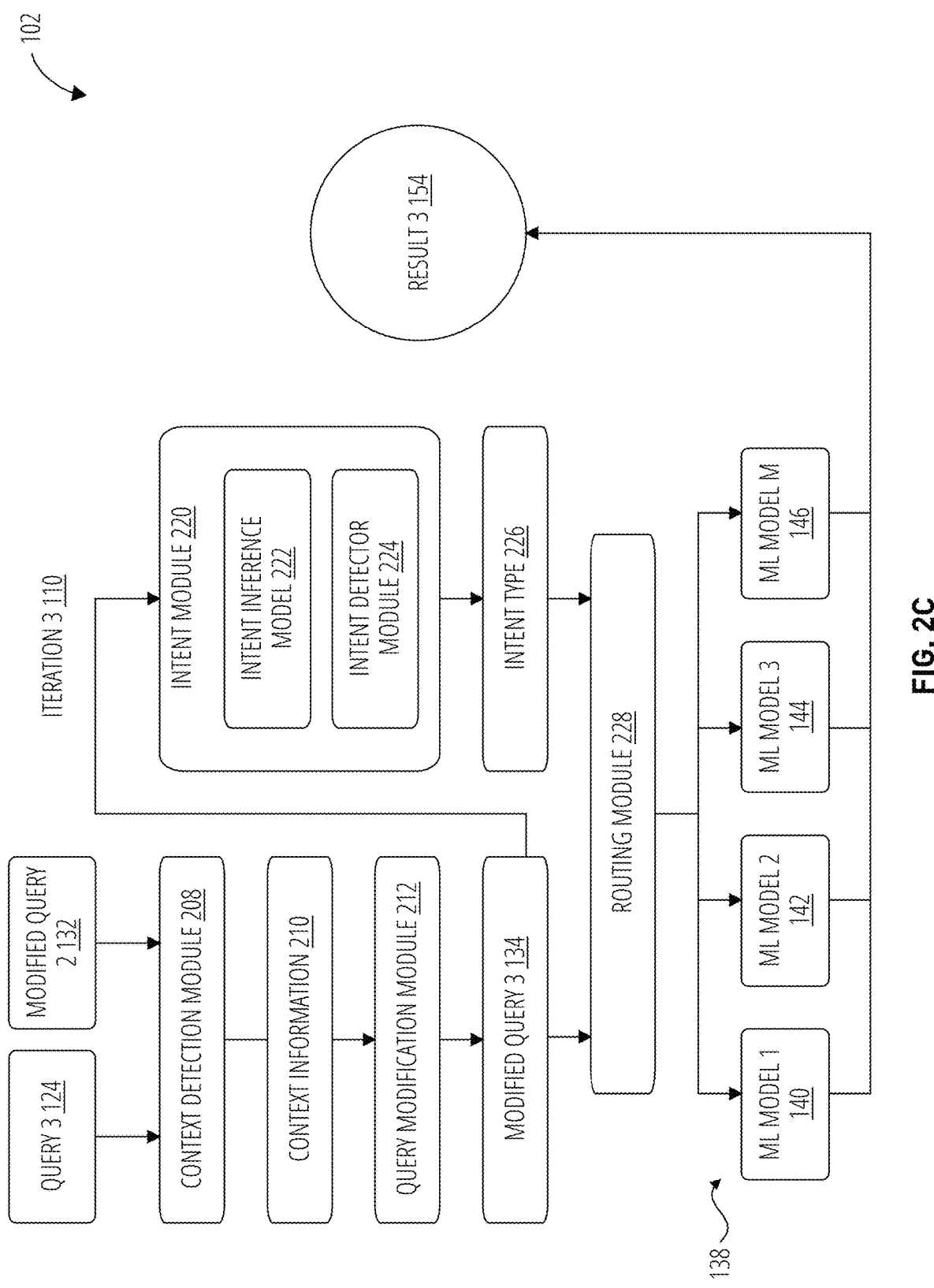
FIG. 2C illustrates an architecture for an AI system in accordance with one embodiment.

FIG. 2C illustrates an example architecture for the AI system 102. FIG. 2C illustrates a third iteration 3 110 for a query session 116 starting with a third query 3 124 to produce a third result 3 154. The operations of iteration 3 110 are similar to those of iteration 2 108. However, instead of the context detection module 208 receiving the second query 2 122 of the query session 116 and the modified query 1 130 generated during iteration 1 106, the context detection module 208 receives the query 3 124 and the modified query 2 132 generated during iteration 2 108.

In iteration 3 110, the context detection module 208 detects, extracts, or generates context information 210 from both the query 3 124 and modified query 2 132. The modified query 2 132 comprises context information 210 from the query 1 120 of the first iteration 1 106 and the query 2 122 of the second iteration 2 108. As a result, the modified query 2 132 represents a summary or accumulation of context information from multiple previous queries 118, which in this case are query 1 120 and query 2 122. The AI system 102 then processes the context information 210 in a manner similar to iteration 2 108 to produce the result 3 154.

This process continues in a recursive loop 114 for Q queries and P modified queries for a number of iterations/ until the query session 116 is terminated.

An example of the operations of the AI system 102 are summarized in Table 1, as follows:

TABLE 1

| | Previous Query | Current Query (what the user actually asks in chat UI) | Rewritten Query | Details on what aspect is being evaluated |
|---|---|---|---|---|
| 1 | <start of new user session with CJA AI Assistant> | compare monthly revenue by country | compare monthly revenue by country | Rewritten query is identical, since nothing to rewrite |
| 2 | compare monthly revenue by country | yearly | Compare yearly revenue by country | Correct Temporal Rewriting Ambiguity. Changes monthly to yearly as requested by user |
| 3 | compare yearly revenue by country | show it as a line chart | Visualize yearly revenue by country as a line chart. | Correct Chart Rewriting. Rewrites sentence to include "as a line chart" |
| 4 | Visualize yearly revenue by country as a line chart | Now change to marketing channel | Visualize yearly revenue by marketing channel as a line chart. | Correct Dimension Replacement. Ambiguous query since user did not specify the name of the attribute to replace. However, we make the correct inference and replace the dimension "country" with "marketing channel" since both are categorical attributes, as opposed to replacing revenue, which is far less likely to be a replacement the user would want. |
| 5 | Visualize yearly revenue by marketing channel as a line chart | what about month over month as bar chart | Visualize month-over-month revenue by marketing channel as a bar chart. | Correct Multiple Modifications. User requests two modifications in a somewhat ambiguous way. Replacing yearly with monthly temporal comparison and to show it as a bar chart. |

The example is continued in Table 2, as follows:

TABLE 2

| | Previous Query | Current Query | Rewritten Query | Details |
|---|---|---|---|---|
| 6 | Visualize month-over-month revenue by marketing channel as a bar chart. | replace with pageviews | Visualize month-over-month pageviews by marketing channel as a bar chart. | Correct Metric Requirement. Ambiguous query since the name of the attribute to replace is not mentioned again. |

TABLE 2-continued

| | | | This is similar to the 4th chat query the user entered, but this time evaluates whether we can infer that the metric is most likely to be replaced, since pageviews is a metric and the other a dimension. |
|---|---|---|---|
| 7 Visualize month-over-month pageviews by marketing channel as a bar chart. | show it for July only | Visualize pageviews for July by marketing channel as a bar chart. | Correct Temporal Rewriting. This evaluates whether we can correctly rewrite the query with resect to the temporal intent. |
| 8 Visualize pageviews for July by marketing channel as a bar chart. | distribution of people by customer tier | distribution of people by customer tier | Correct Context Detection for No Rewriting Case. Correctly detects that for the user query, we do not need to rewrite it using the previous query. |
| 9 distribution of people by customer tier | compare orders by customer tier | compare orders by customer tier | Correct Context Detection for No Rewriting Case. This is slightly more ambiguous, since this new question the user enters shares the customer tier with the previous query. |

In some cases, prior to context detection by the context detection module 208, the context detection module 208 comprises instructions to determine whether context information 210 is useful for a given query. When the context detection module 208 determines the context information 210 is useful for a given query, the context detection module 208 generates the context information 210 based on a query and/or previous query. When the context detection module 208 determines that context information 210 is not useful for a given query, the context detection module 208 passes the original query as an unmodified query to the intent module 220. Context detection questions illustrating when additional context is helpful and questions that are self-contained and can be answered without any additional context from the query session 116 are shown in Table 3, as follows:

TABLE 3

| Context Required | Examples |
|---|---|
| False | Compare revenue by country |
| | Predict revenue for US for next month |
| | Show me the summary caption for revenue by country |
| | Show revenue for US by country |
| | Show top-5 channels by people for June |
| True | Show US only |
| | Yesterday |
| | Change to donut chart |
| | Instead of country showing marketing channel for US |
| | Now show for Chrome users only |

Figure 3:
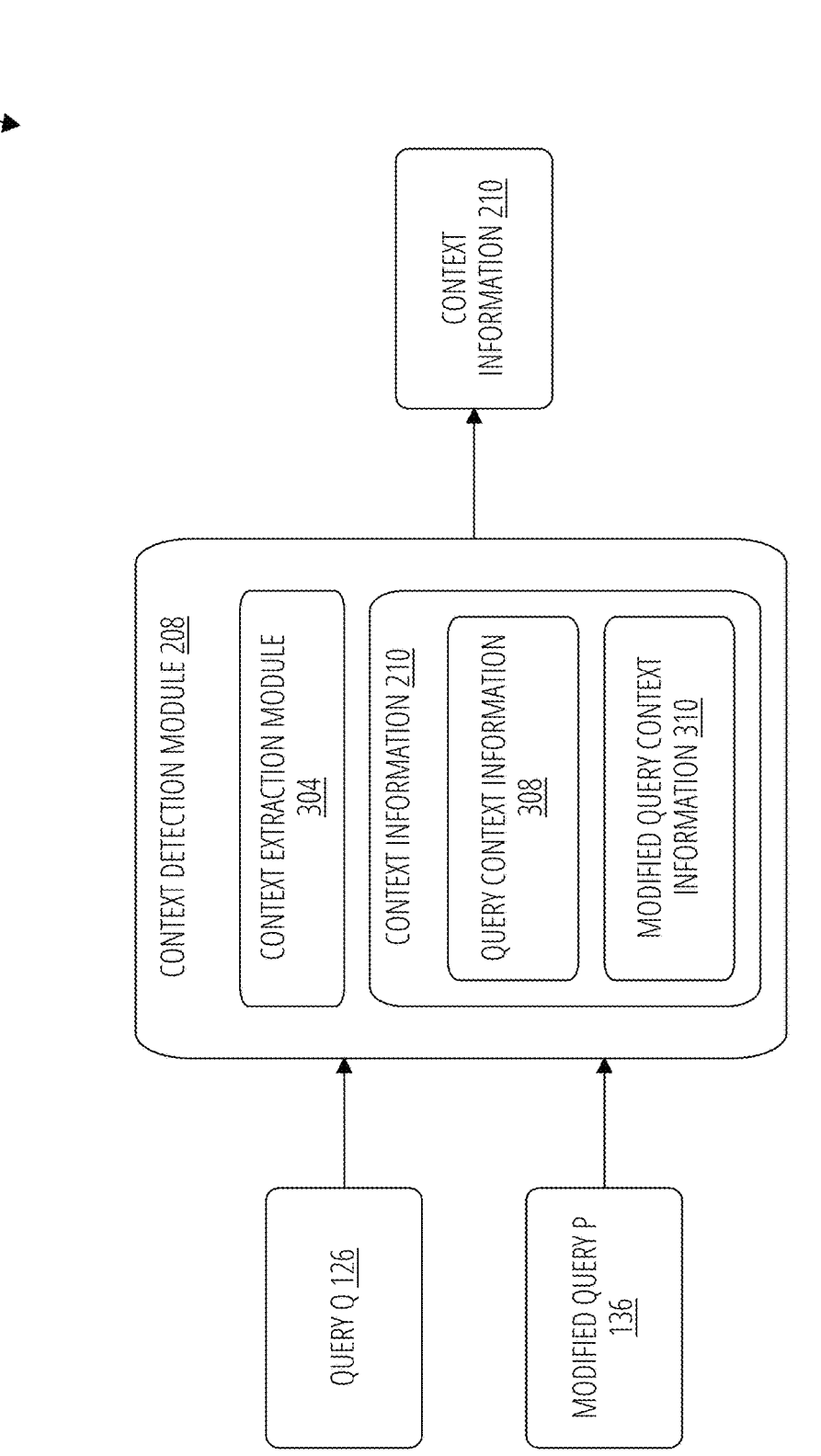
FIG. 3 illustrates an architecture for a context detection module in accordance with one embodiment.

FIG. 3 illustrates a logic diagram 300 representing an example of an architecture for the context detection module 208. As previously described, the context detection module

208 receives as input a query Q 126 and a modified query P 136 and it outputs the context information 210.

In one embodiment, the context detection module 208 comprises a context extraction module 304 to extract context information 210. The context information 210 comprises query context information 308 and modified query context information 310. The context extraction module 304 extracts the query context information 308 from the query Q 126. The context extraction module 304 extracts the modified query context information 310 from the modified query P 136. The context detection module 208 then combines the query context information 308 and the modified query context information 310 to generate the context information 210 for output to the query modification module 212.

Figure 4:
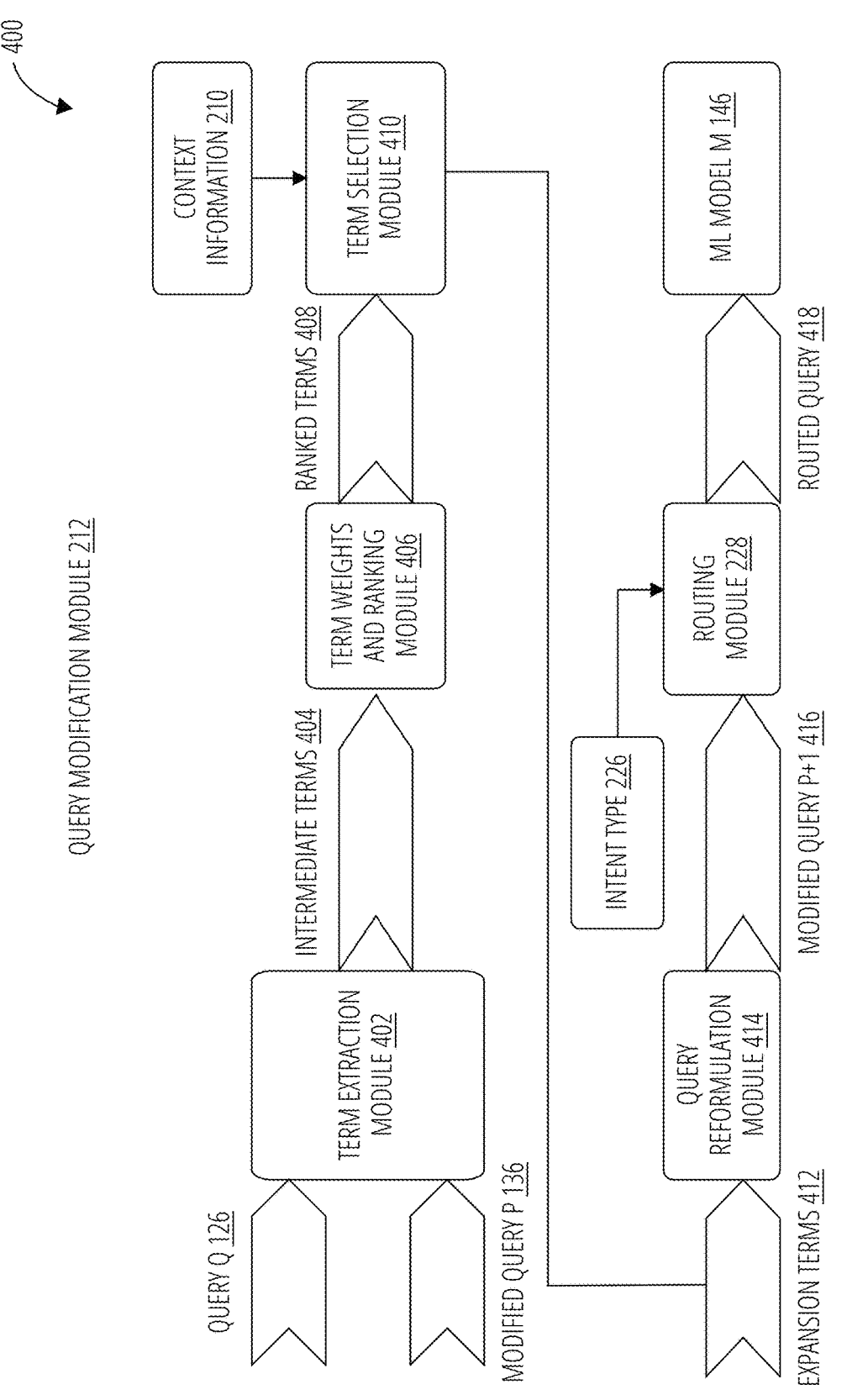
FIG. 4 illustrates an architecture for a query modification module in accordance with one embodiment.

FIG. 4 illustrates a logic diagram 400 representing an example of an architecture for the query modification module 212. As previously described, the query modification module 212 automatically reformulates queries 118 without any user intervention.

As depicted in the logic diagram 400, the query modification module 212 receives a query Q 126 and modified query P 136 as input. A term extraction module 402 performs text extraction from the query Q 126 and/or the modified query P 136. The term extraction module 402 performs a series of pre-processing operations from the extracted text, such as pre-processing raw natural language text from the query Q 126 and/or the modified query P 136 in preparation for text feature extraction. Examples of some common pre-processing operations include tokenization which breaks the natural language text down into individual words or tokens, removing top words that are very common in language and do not carry much meaning (e.g., "a", "an", "the", "and", "of", "in", etc.), stemming or lemmatization to reduce words to their base form or root, removing special characters and digits from the text, vectorization to convert the text into a numerical format that can be used as input to a text encoder, and so forth. Vectorization is usually done using techniques such as bag-of-words or term frequency (TF) and inverse document frequency (IDF) (TD-IDF), which represent the text as a vector of word frequencies or weights. The term extraction module 402 outputs a set of intermediate terms 404 as output to a term weights and ranking module 406.

The term weights and ranking module 406 receives the intermediate terms 404 and assigns weights and ranks to the set of intermediate terms 404. The term weights and ranking module 406 assigns weights to denote relevancy of the terms in an expanded query and are further used in ranking intermediate terms 404 based on relevancy. The term weights and ranking module 406 outputs a set of ranking ranked terms 408 as output to a term selection module 410.

The term selection module 410 receives the ranked terms 408 and selects a set of expansion terms 412. In one embodiment, for example, the term selection module 410 selects a top percentage of the ranked terms 408 for query expansion. This may occur when a number of ranked terms 408 exceeds a defined threshold. In one embodiment, for example, the term selection module 410 selects terms from the set of ranked terms 408 or a subset of ranked terms 408 as expansion terms 412 based on the context information 210 generated by the context detection module 208. The term selection module 410 outputs the expansion terms 412 to the query reformulation module 414.

The query reformulation module 414 receives as input the expansion terms 412. The purpose of the query reformulation module 414 is to reformulate and/or expand the query Q 126 to achieve a better result R 156. The query reformulation module 414 reformulates the query Q 126 based on the expansion terms 412 and the weights assigned to individual terms of the expanded query using a query reweighting technique. The query reformulation module 414 then reformulates the query Q 126 with the expansion terms 412 to generate a modified query P+1 416. The query reformulation module 414 outputs the modified query P+1 416 to the routing module 228.

The routing module 228 receives the modified query P+1 416 and the intent type 226 for the modified query P+1 416 as generated by the intent module 220. The routing module 228 selects an ML model M 146 to process the modified query P+1 416 based on the intent type 226. The routing module 228 then routes the modified query P+1 416 to the selected ML model M 146.

Figure 5:
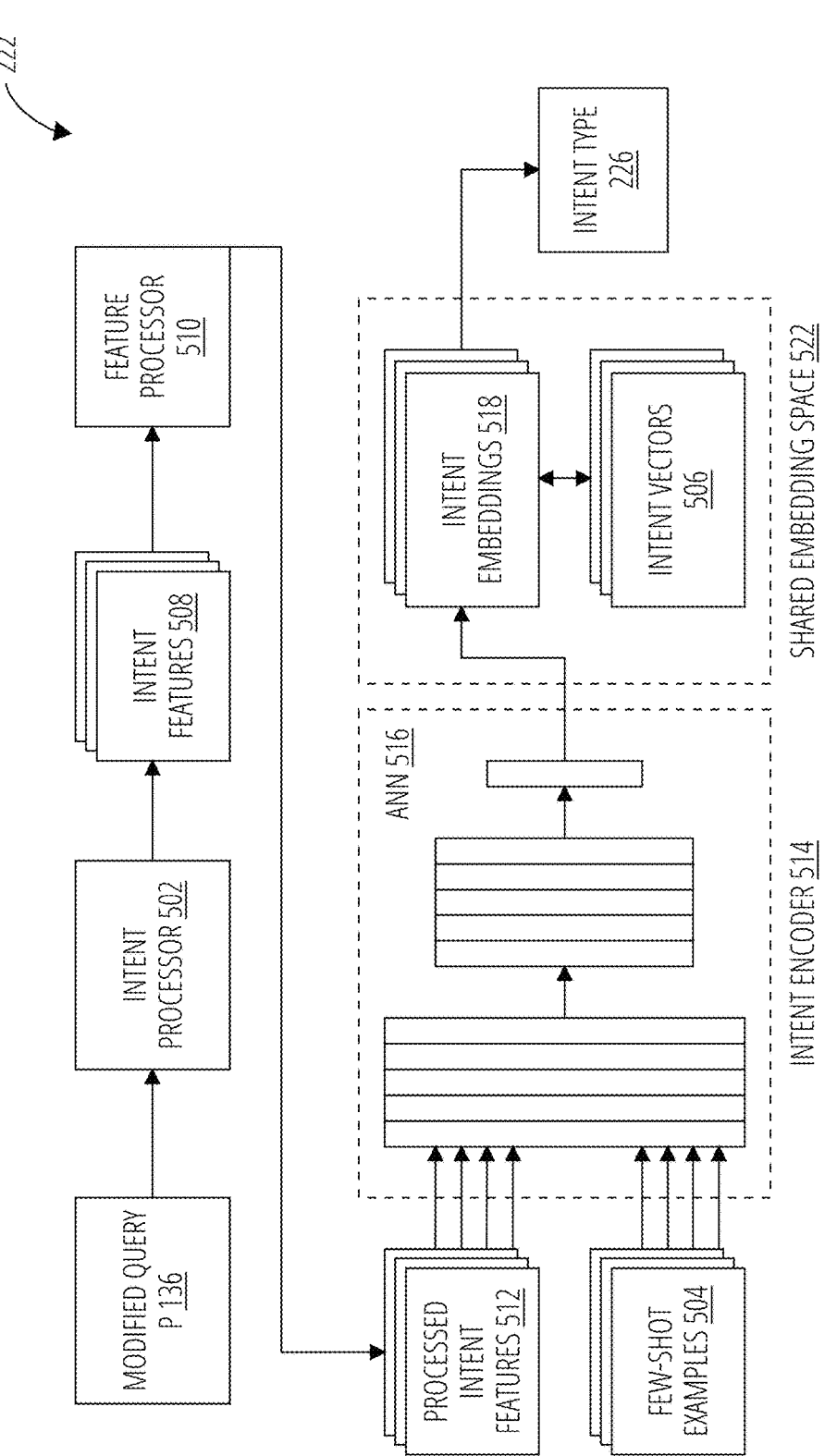
FIG. 5 illustrates an architecture for an intent inference model in accordance with one embodiment.

FIG. 5 illustrates an example architecture for an intent inference model 222 of an intent module 220 suitable for implementation as part of the AI system 102. The intent inference model 222 shows an example of intent processing according to aspects of the present disclosure. In one embodiment, for example, the intent inference model 222 processes a modified query P 136, and it outputs text features from the modified query P 136 to an intent processor 502 of the AI system 102.

The intent processor 502 selects one or more intent features 508 from the pre-processed text information from the modified query P 136. Examples of intent features 508 that are present in the modified query P 136 include without limitation individual words, a sentence, a phrase, a paragraph, semantic information, context information, time information, a part of speech (e.g. noun, verb, adjective) of each word, a frequency of words, a length of sentences, use of punctuation marks (e.g., such as periods, commas, and exclamation points), use of capital letters in a word (e.g., a proper noun), spelling and grammar, and other intent features from the modified query P 136. These are just a few examples of the many intent features that can be present in the modified query P 136. The intent inference model 222 uses combinations of these and other intent features to support search and other tasks related to natural language processing.

A feature processor 510 optionally processes the intent features 508 to scale the intent features 508 to a standard size or format to match the input dimensions of an intent encoder 514. The feature processor 510 outputs a set of processed intent features 512 to the intent encoder 514.

The intent encoder 514 receives as input the processed intent features 512. The intent encoder 514 passes the processed intent features 512 through a neural network, such as an artificial neural network (ANN) like ANN 516. In one embodiment, the ANN 516 is a transformer-based neural network, such as Generative Pre-trained Transformer (GPT) or Bidirectional Encoder Representations from Transformers (BERT). The transformer-based neural network is trained to encode natural language text from the modified query P 136 into a set of intent embeddings 518 that are mapped to a shared embedding space to support searches for similar embeddings or vectors using a similarity measure such as cosine similarity, for example.

In one embodiment, the intent encoder 514 of the intent inference model 222 may be trained using one-shot learning. One-shot learning is a machine learning paradigm where the model is designed to learn information and make accurate predictions from a very limited amount of data, specifically, data that includes only one or a few examples per class. This approach is in contrast to traditional machine learning methods, which require large datasets to train a model effectively. One-shot learning is particularly useful in applications where collecting a large amount of data is impractical or impossible. It relies heavily on sophisticated algorithms capable of extracting and generalizing critical information from minimal input, such as advanced pattern recognition and similarity measures. One-shot learning is prevalent in tasks like facial recognition, where a system must correctly identify a person from a single image.

In one embodiment, for example, the intent encoder 514 of the intent inference model 222 may be trained using few-shot learning, such as from few-shot examples 504. Few-shot learning is similar to one-shot learning but involves learning from a few examples rather than just one. Typically, this means the model is trained on very small datasets that include only a few instances per class. Few-shot learning aims to construct predictive models that can generalize well from a limited number of training samples. It uses strategies such as meta-learning, where the model learns to learn by using prior knowledge from related tasks, and transfer learning, where a model trained on one task is adapted for another related task. Few-shot learning is crucial for tasks where data is scarce or expensive to obtain, enabling models to perform classification, regression, and other predictions with minimal input. Both one-shot and few-shot learning represent significant steps towards creating more flexible and adaptable machine learning systems that can operate under the constraints of data scarcity, with wide applications in computer vision, natural language processing, and beyond.

In one embodiment, for example, the intent inference model 222 compares the intent embeddings 518 to a set of intent vectors 506 stored in the shared embedding space 522 based on a similarity measure. A similarity measure in machine learning is a metric used to determine how similar two data points are within a given dataset. It quantifies the resemblance between pairs of objects, which can be anything from numerical vectors, text documents, images, etc., based on their features or attributes. Similarity measures are used in various machine learning applications, including clustering, classification, recommendation systems, and anomaly detection. There are several types of similarity measures, each appropriate for different kinds of data and tasks. Some of the most commonly used similarity measures include Euclidean Distance, Cosine Similarity, Jaccard Similarity, Pearson Correlation, Hamming Distance, Mahalanobis Distance, and other suitable similarity measures. The intent inference model 222 then outputs an intent type 226 for the modified query P 136 based on the similarity measures.

Figure 6:
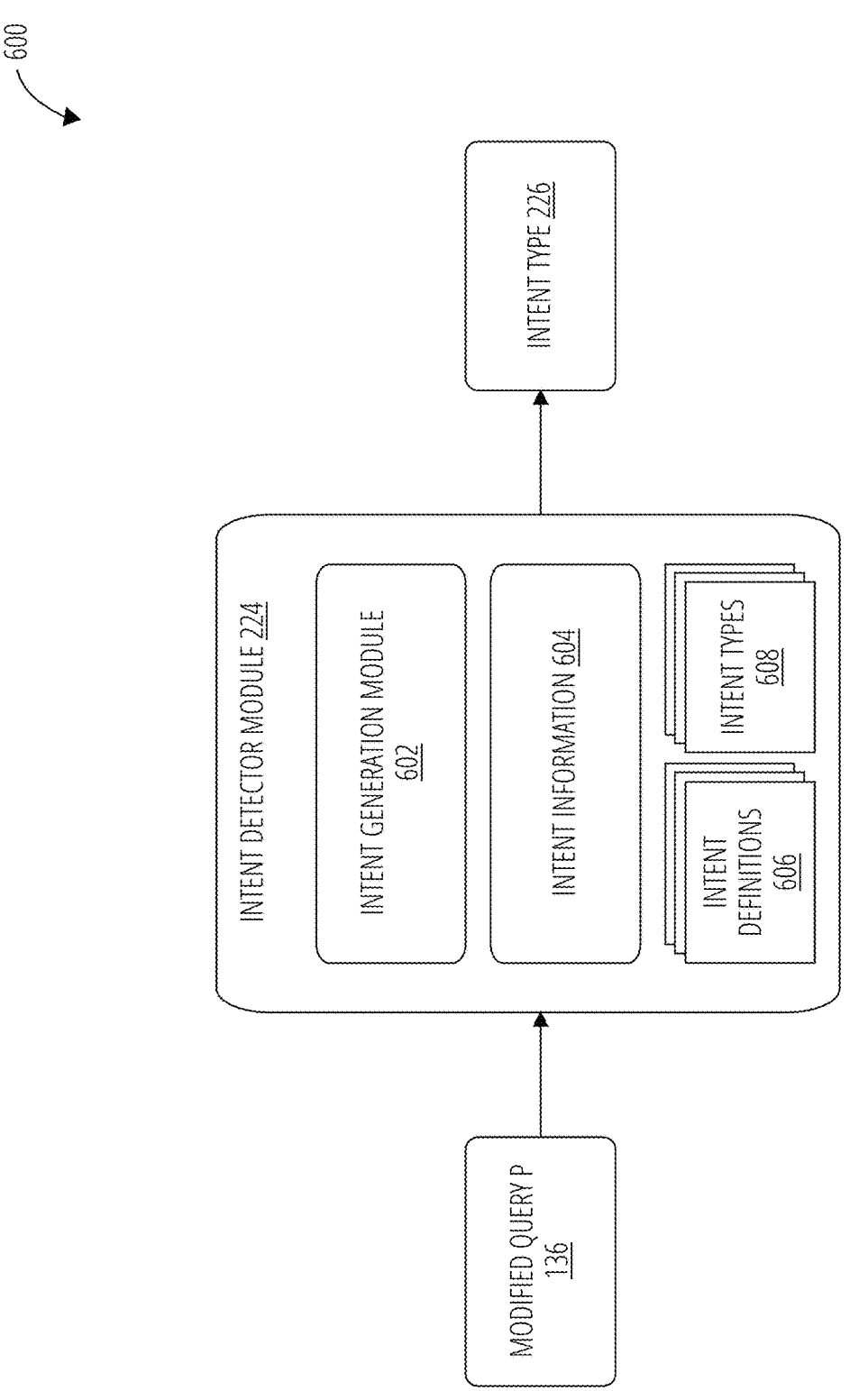
FIG. 6 illustrates an architecture for an intent detector module in accordance with one embodiment.

FIG. 6 illustrates a logic diagram 600. The logic diagram 600 is an example architecture for an intent detector module 224 of an intent module 220. Similar to the intent inference model 222, the intent detector module 224 implements another way of detecting an intent type 226 for a modified query P 136. Unlike the intent inference model 222, the intent detector module 224 uses logic and/or programming instructions to determine the intent type 226.

As depicted in logic diagram 600, the intent detector module 224 receives as input a modified query P 136. An intent generation module 602 of the intent inference model 222 executes instructions using circuitry, such as processing circuitry, to generate intention intent information 604. The intent generation module 602 utilizes a set of intent definitions 606 having corresponding intent types 608. The intent generation module 602 compares the intent definitions 606 to the intent information 604. When there is a match between one of the input intent definitions 606 and the intent information 604, the intent detector module 224 selects one of the intent types 608 corresponding to the matched intent definition, and it outputs the matched intent type as the intent type 226.

Figure 7:
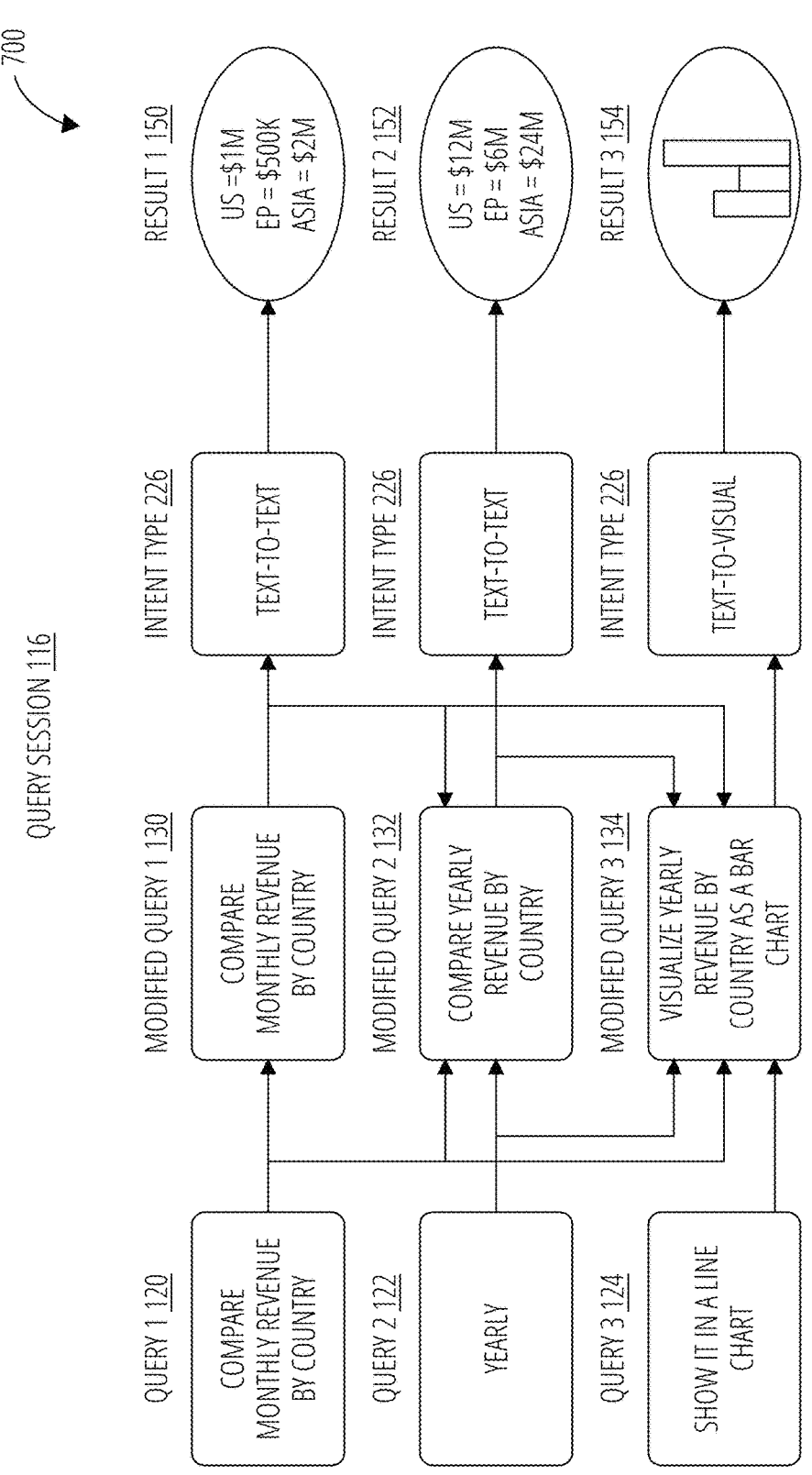
FIG. 7 illustrates a logic diagram for an AI system in accordance with one embodiment.

FIG. 7 illustrates a logic diagram 700. The logic diagram 700 comprises an example of a set of operations for the AI system 102.

As depicted in the logic diagram 700, in a first iteration 1 106, assume a query 1 120 is an NLP question such as "Compare monthly revenue by country." The AI system 102 processes the query 1 120 and generates a modified query 1 130. In this case, since the query 1 120 is the first query in the query session 116, there is no context information 210 from a previous query to augment the query 1 120. Therefore, the modified query 1 130 remains the same as the query 1 120. The intent module 220 receives the modified query 1 130, and it determines an intent type 226 of "text-to-text". This intent type 226 is suitable for processing by a text-to-text model, such as an LLM. The routing module 228 selects an ML model M 146 that is an LLM. The LLM receives the modified query 1 130, and it returns a result 1 150. The result 1 150 comprises a text response indicating a monthly revenue by country of $1,000,000 USD for the United States, $500,000 USD for the European Union (EU), and $2,000,000 USD for Asia.

In a second iteration 2 108, assume a query 2 122 is another NLP question such as "Yearly." Note this is a one word question without any context information surrounding the word "Yearly." The AI system 102 processes the query 2 122 and generates a modified query 2 132. In this case, since the query 2 122 is the second query in the query session 116, there is context information 210 available from a previous query, namely the modified query 1 130, to augment the query 2 122. Therefore, the modified query 2 132 is an augmented version of the query 2 122. The intent module 220 receives the modified query 2 132, and it determines an intent type 226 of "text-to-text". This intent type 226 is suitable for processing by a text-to-text model, such as an LLM. The routing module 228 selects an ML model M 146 that is an LLM. The LLM receives the modified query 1 130, and it returns a result 2 152. The result 2 152 comprises a text response indicating an annual revenue by country of $12,000,000 USD for the United States, $6,000,000 USD for the European Union (EU), and $24,000,000 USD for Asia.

In a third iteration 3 110, assume a query 3 is another NLP question such as "Show it on a line chart." Note this is a multiple word question, and yet by itself, does not have any context information surrounding the word "it." The AI system 102 processes the query 3 124 and generates a modified query 3 134. In this case, since the query 3 124 is the third query in the query session 116, there is context information 210 available from multiple previous queries, namely the modified query 1 130 and the modified query 2 132, to augment the query 2 122. Note the modified query 2 132 contains all the information of the modified query 1 130. Therefore, the modified query 3 134 is an augmented version of the query 3 124. The intent module 220 receives the modified query 3 134, and it determines an intent type 226 of "text-to-visual". This intent type 226 is suitable for processing by a text-to-visualization model, such as a sequence-to-sequence model, a conditional generative model, or a multi-modal model. The routing module 228 selects an ML model M 146 that is a multi-modal model. The multi-modal model receives the modified query 3 134, and it returns a result 3 154. The result 3 154 comprises a visual response in the form of a bar chart with bars indicating an annual revenue by country of $12,000,000 USD for the United States, $6,000,000 USD for the European Union (EU), and $24,000,000 USD for Asia.

Figure 8:
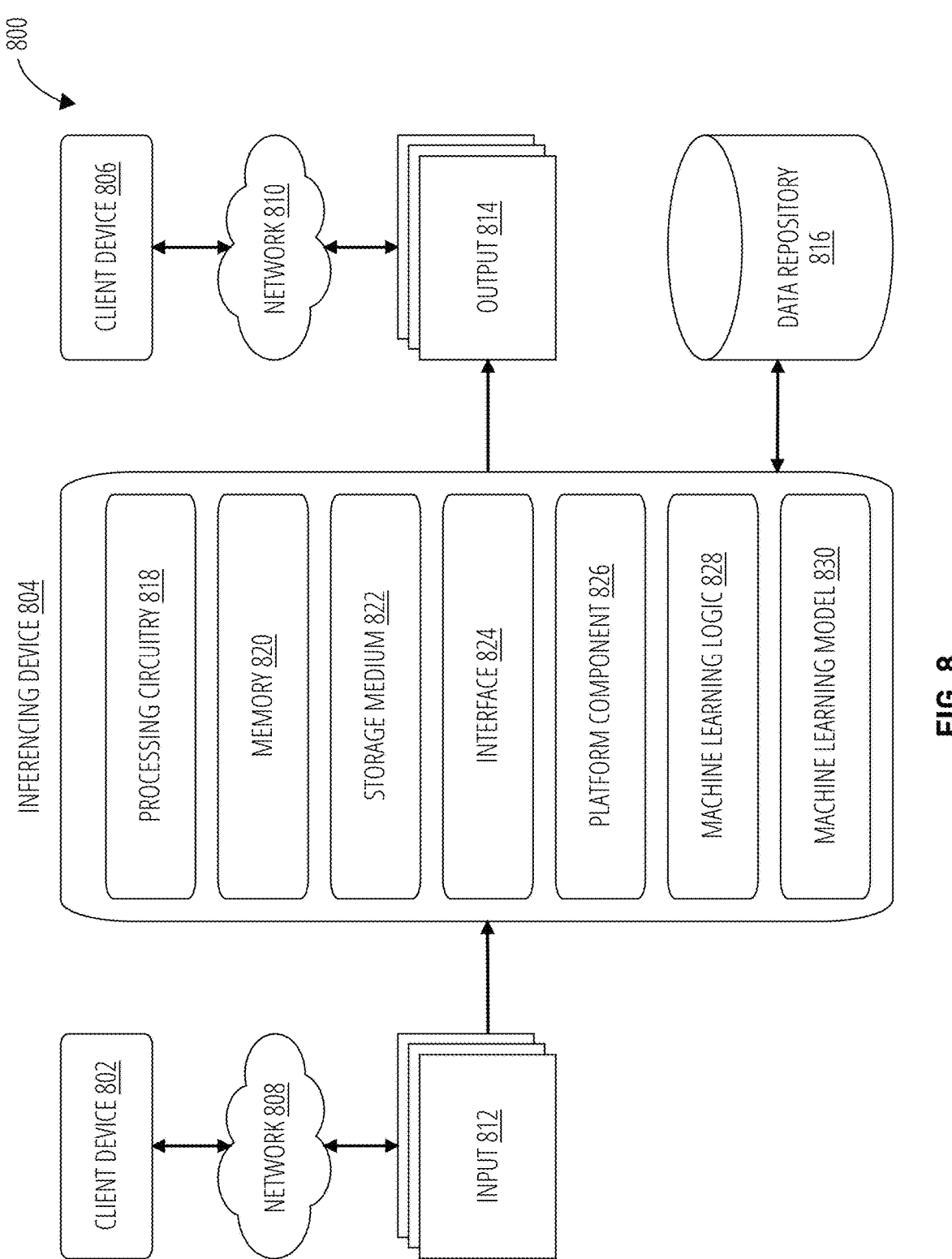
FIG. 8 illustrates a system for an AI system in accordance with one embodiment.

FIG. 8 illustrates an embodiment of a system 800. The system 800 is suitable for implementing one or more embodiments as described herein. In one embodiment, for example, the system 800 is an AI system 102 suitable for efficiently and effectively retrieving results from one or more ML models 138. The AI system 102 implements prompt engineering techniques to generate a modified query P 136 for an ML model M 146 that includes context information 210. The context information 210 includes context information 210 from multiple queries 118. For example, the multiple queries 118 include a current query Q 126 and one or more previous queries, such as a modified query P 136. The one or more previous queries 118 are summarized using a recursive summary technique, such as through use of the recursive loop 114. Further, some embodiments are particularly directed to analyzing a modified query P 136 for an intent type 226 to assist in routing the modified query P 136 to relevant ML models 138, such as ML model M 146.

The system 800 comprises a set of T devices, where T is any positive integer. FIG. 8 depicts three devices (T=3), including a client device 802, an inferencing device 804, and a client device 806. The inferencing device 804 communicates information with the client device 802 and the client device 806 over a network 808 and a network 810, respectively. The information may include input 812 from the client device 802 and output 814 to the client device 806, or vice-versa. In one alternative, the input 812 and the output 814 are communicated between the same client device 802 or client device 806. In another alternative, the input 812 and the output 814 are stored in a data repository 816. In yet another alternative, the input 812 and the output 814 are communicated via a platform component 826 of the inferencing device 804, such as an input/output (I/O) device (e.g., a touchscreen, a microphone, a speaker, etc.).

Figure 14:
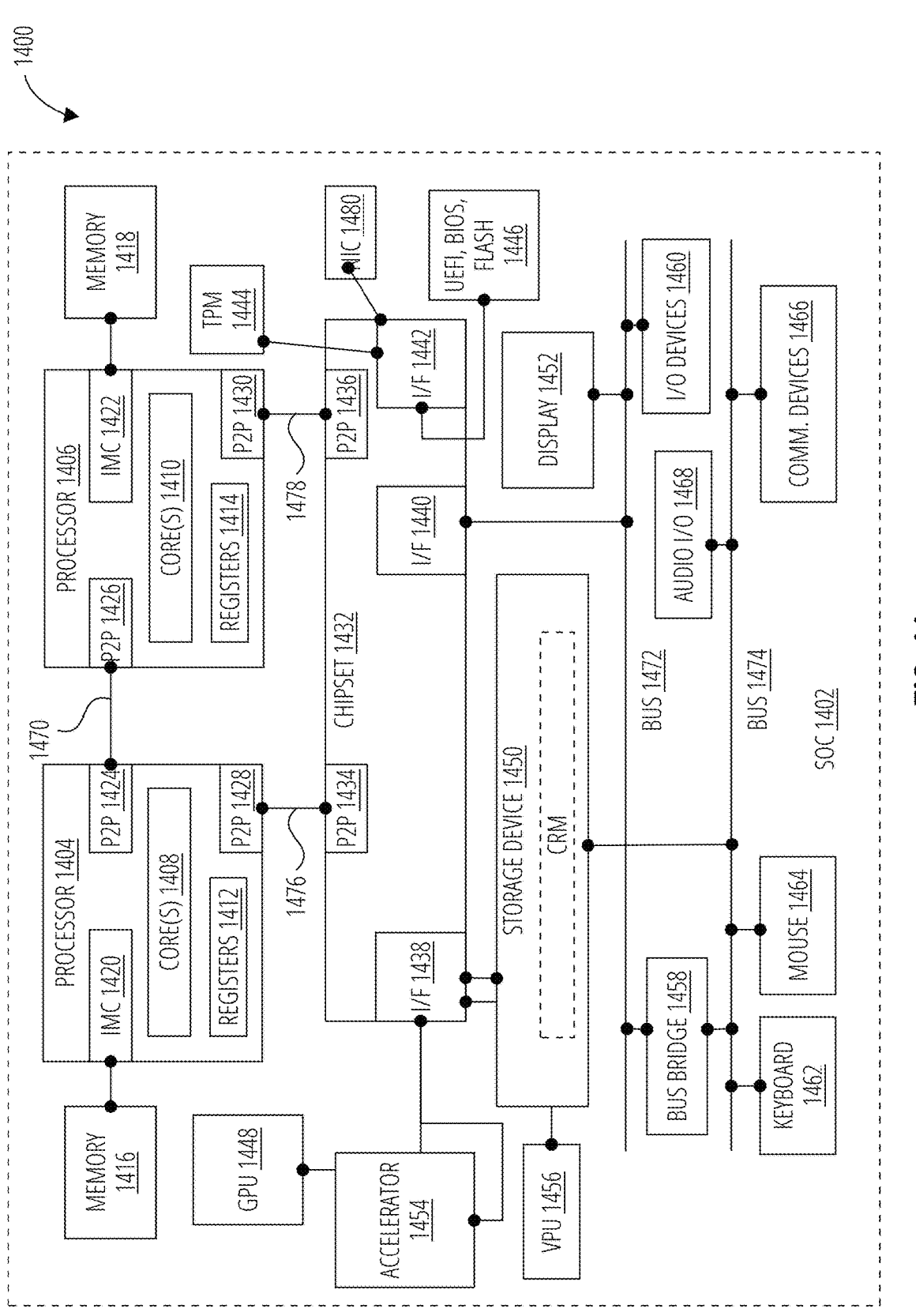
FIG. 14 illustrates a computing architecture in accordance with one embodiment.

As depicted in FIG. 8, the inferencing device 804 includes processing circuitry 818, a memory 820, a storage medium 822, an interface 824, a platform component 826, ML logic 828, and an ML model 830. In some implementations, the inferencing device 804 includes other components or devices as well. Examples for software elements and hardware elements of the inferencing device 804 are described in more detail with reference to a computing architecture 1400 as depicted in FIG. 14. Embodiments are not limited to these examples.

Figure 15:
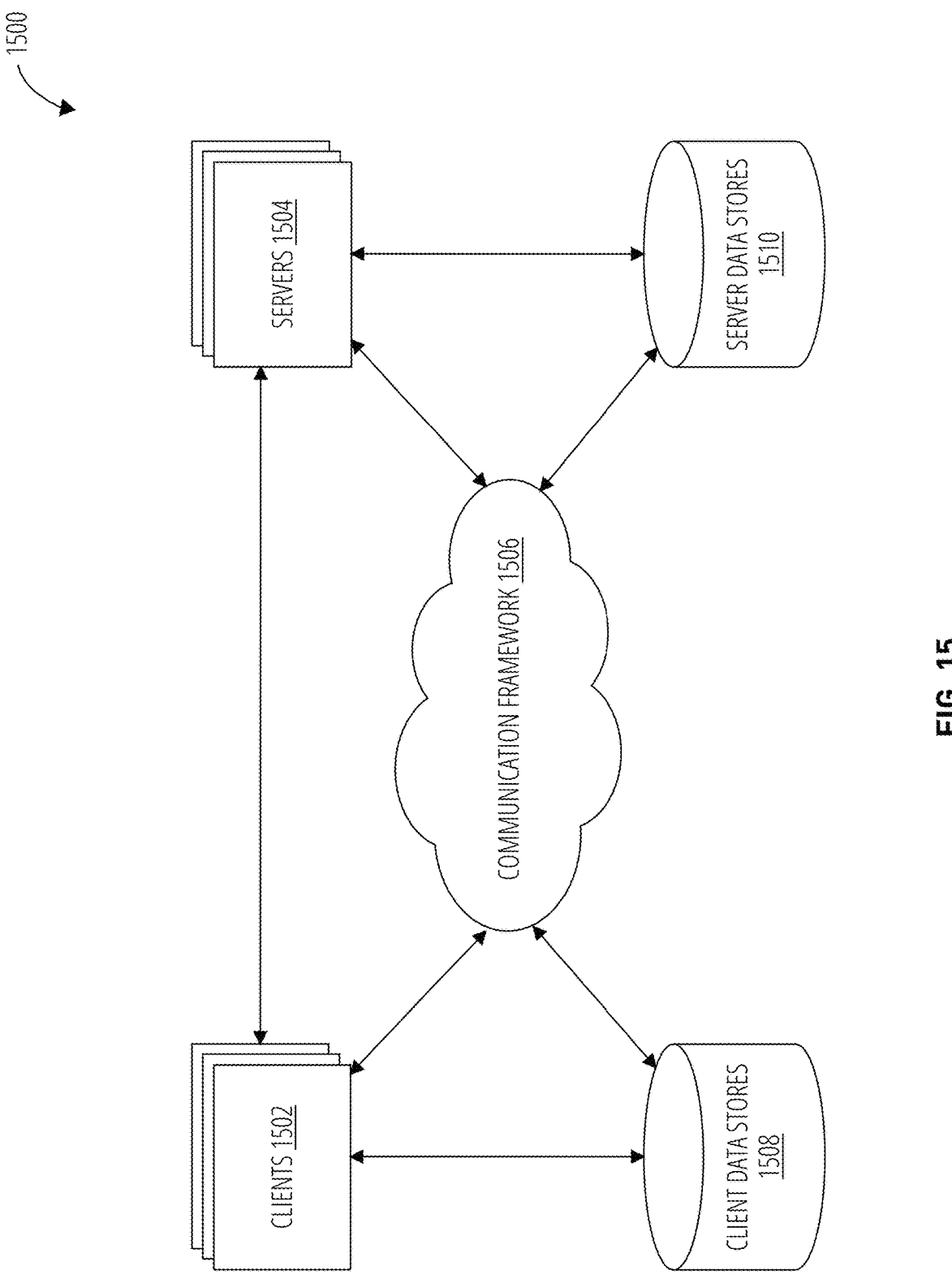
FIG. 15 illustrates a communications architecture in accordance with one embodiment.

The inferencing device 804 is generally arranged to receive an input 812, process the input 812 via one or more AI/ML techniques, and send an output 814. The inferencing device 804 receives the input 812 from the client device 802 via the network 808, the client device 806 via the network 810, the platform component 826 (e.g., a touchscreen as a text command or microphone as a voice command), the memory 820, the storage medium 822 or the data repository 816. The inferencing device 804 sends the output 814 to the client device 802 via the network 808, the client device 806 via the network 810, the platform component 826 (e.g., a touchscreen to present text, graphic or video information or speaker to reproduce audio information), the memory 820, the storage medium 822 or the data repository 816. Examples for the software elements and hardware elements of the network 808 and the network 810 are described in more detail with reference to a communications architecture 1500 as depicted in FIG. 15. Embodiments are not limited to these examples.

The inferencing device 804 includes ML logic 828 and an ML model 830 to implement various AI/ML techniques for various AI/ML tasks. The ML logic 828 receives the input 812, and processes the input 812 using the ML model 830. The ML model 830 performs inferencing operations to generate an inference for a specific task from the input 812. In some cases, the inference is part of the output 814. The output 814 is used by the client device 802, the inferencing device 804, or the client device 806 to perform subsequent actions in response to the output 814.

In various embodiments, the ML model 830 is a trained ML model 830 using a set of training operations. An example of training operations to train the ML model 830 is described with reference to FIG. 10.

Operations for the disclosed embodiments are further described with reference to the following figures. Some of the figures include a logic flow. Although such figures presented herein include a particular logic flow, the logic flow merely provides an example of how the general functionality as described herein is implemented. Further, a given logic flow does not necessarily have to be executed in the order presented unless otherwise indicated. Moreover, not all acts illustrated in a logic flow are required in some embodiments. In addition, the given logic flow is implemented by a hardware element, a software element executed by one or more processing devices, or any combination thereof. The embodiments are not limited in this context.

FIG. 9 illustrates an embodiment of a logic flow 900. The logic flow 900 is representative of some or all of the operations executed by one or more embodiments described herein. For example, the logic flow 900 includes some or all of the operations performed by devices or entities within the system 800 or the apparatus 1000. In one embodiment, the logic flow 900 is implemented as instructions stored on a non-transitory computer-readable storage medium, such as the storage medium 822, that when executed by the processing circuitry 818 causes the processing circuitry 818 to perform the described operations. The storage medium 822 and processing circuitry 818 may be co-located, or the instructions may be stored remotely from the processing circuitry 818. Collectively, the storage medium 822 and the processing circuitry 818 may form a system.

In block 902, the logic flow 900 comprises generating, by a context detection module, context information for a first query includes natural language information to request a result from one of a plurality of machine learning models. In block 904, the logic flow 900 comprises modifying, by a query modification module, the first query based the context information to form a first modified query. In block 906, the logic flow 900 comprises determining, by an intent module, an intent type for the first modified query. In block 908, the logic flow 900 comprises selecting, by a routing module, a machine learning model from the plurality of machine learning models based on the intent type. In block 910, the logic flow 900 comprises routing, by the routing module, the first modified query to the selected machine learning model.

By way of example, a memory stores instructions that when executed by circuitry causes the circuitry to perform generating, by a context detection module 208, context information 210 for a first query 202 that includes natural language information to request a result 1 150 from one of a plurality of ML models 138, modifying, by a query modification module 212, the first query 202 based the context information 210 to form a first modified query 1 130, determining, by an intent module 220, an intent type 226 for the first modified query 1 130, selecting, by a routing module 228, an ML model M 146 from the plurality of ML models 138 based on the intent type 226, and routing, by the routing module 228, the first modified query 1 130 to the selected ML model M 146.

The circuitry may further perform extracting, by a context extraction module 304 of the context detection module 208, query context information 308 that includes context information 210 from the first query 1 120.

The circuitry may further perform generating, by the context detection module 208, context information 210 for a second query 2 122 that includes natural language information to request a result 2 152 from one of the plurality of ML models 138 and the first modified query 1 130, modifying, by the query modification module 212, the second query 2 122 based the context information 210 to form a second modified query 2 132, determining, by an intent module 220, an intent type 226 for the second modified query 2 132, selecting, by a routing module 228, an ML model M 146 from the plurality of ML models 138 based on the intent type 226, and routing, by the routing module 228, the second modified query 2 132 to the selected ML model M 146.

The circuitry may further perform determining, by an intent inference model 222 of the intent module 220, the intent type 226 for the first modified query 1 130, where the intent inference model 222 is a machine learning model trained to predict different intent types 226.

The circuitry may further perform determining, by an intent detector module 224 of the intent module 220, the intent type 226 of the first modified query 1 130, where the intent detector module 224 uses a set of intent definitions 606 corresponding to different intent types 608.

The circuitry may further perform determining, by an intent inference model 222 and an intent detector module 224 of the intent module 220, the intent type 226 for the first modified query 1 130, where the intent inference model 222 and the intent detector module 224 operate in parallel or in sequence.

The circuitry may further perform extracting, by a context extraction module 304 of the context detection module 208, query context information 308 and modified query context information 310, the query context information 308 to include context information from the second query 2 122 and the modified query context information 310 includes context information from the first modified query 1 130.

The circuitry may further perform determining, by an intent inference model of the intent module, a first intent type for the query, determining, by an intent detector module of the intent module, a second intent type for the query, comparing, by the intent module, the first intent type and the second intent type, and determining, by the intent module, the intent type for the query when the first intent type matches the second intent type.

Figure 10:
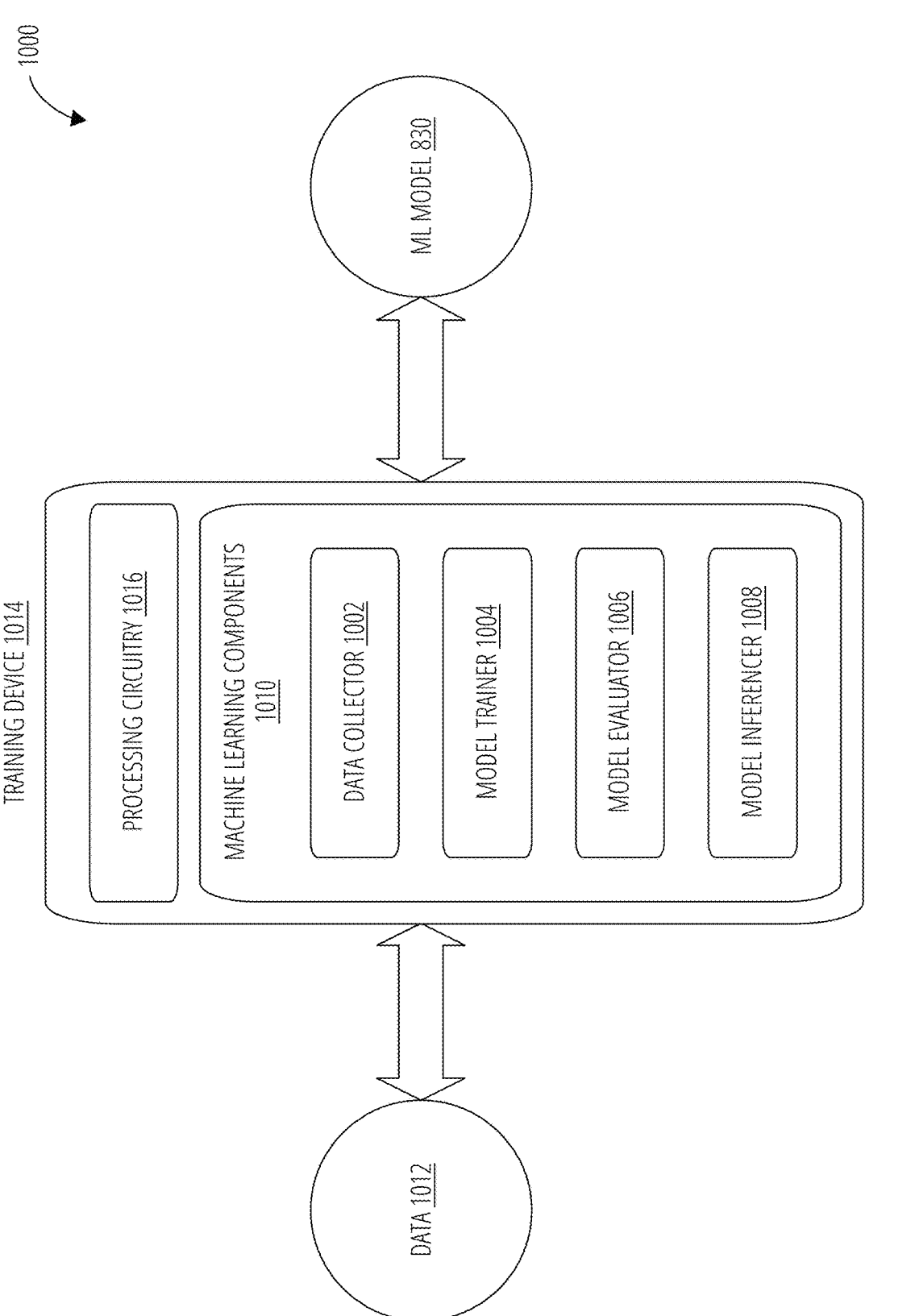
FIG. 10 illustrates an apparatus in accordance with one embodiment.

FIG. 10 illustrates an apparatus 1000. The apparatus 1000 depicts a training device 1014 suitable to generate a trained ML model 830 for the inferencing device 804 of the system 800. As depicted in FIG. 10, the training device 1014 includes a processing circuitry 1016 and a set of ML components 1010 to support various AI/ML techniques, such as a data collector 1002, a model trainer 1004, a model evaluator 1006 and a model inferencer 1008.

In general, the data collector 1002 collects data 1012 from one or more data sources to use as training data for the ML model 830. The data collector 1002 collects different types of data 1012, such as text information, audio information, image information, video information, graphic information, and so forth. The model trainer 1004 receives as input the collected data and uses a portion of the collected data as test data for an AI/ML algorithm to train the ML model 830. The model evaluator 1006 evaluates and improves the trained ML model 830 using a portion of the collected data as test data to test the ML model 830. The model evaluator 1006 also uses feedback information from the deployed ML model 830. The model inferencer 1008 implements the trained ML model 830 to receive as input new unseen data, generate one or more inferences on the new data, and output a result such as an alert, a recommendation or other post-solution activity.

An exemplary AI/ML architecture for the ML components 1010 is described in more detail with reference to FIG. 11.

Figure 11:
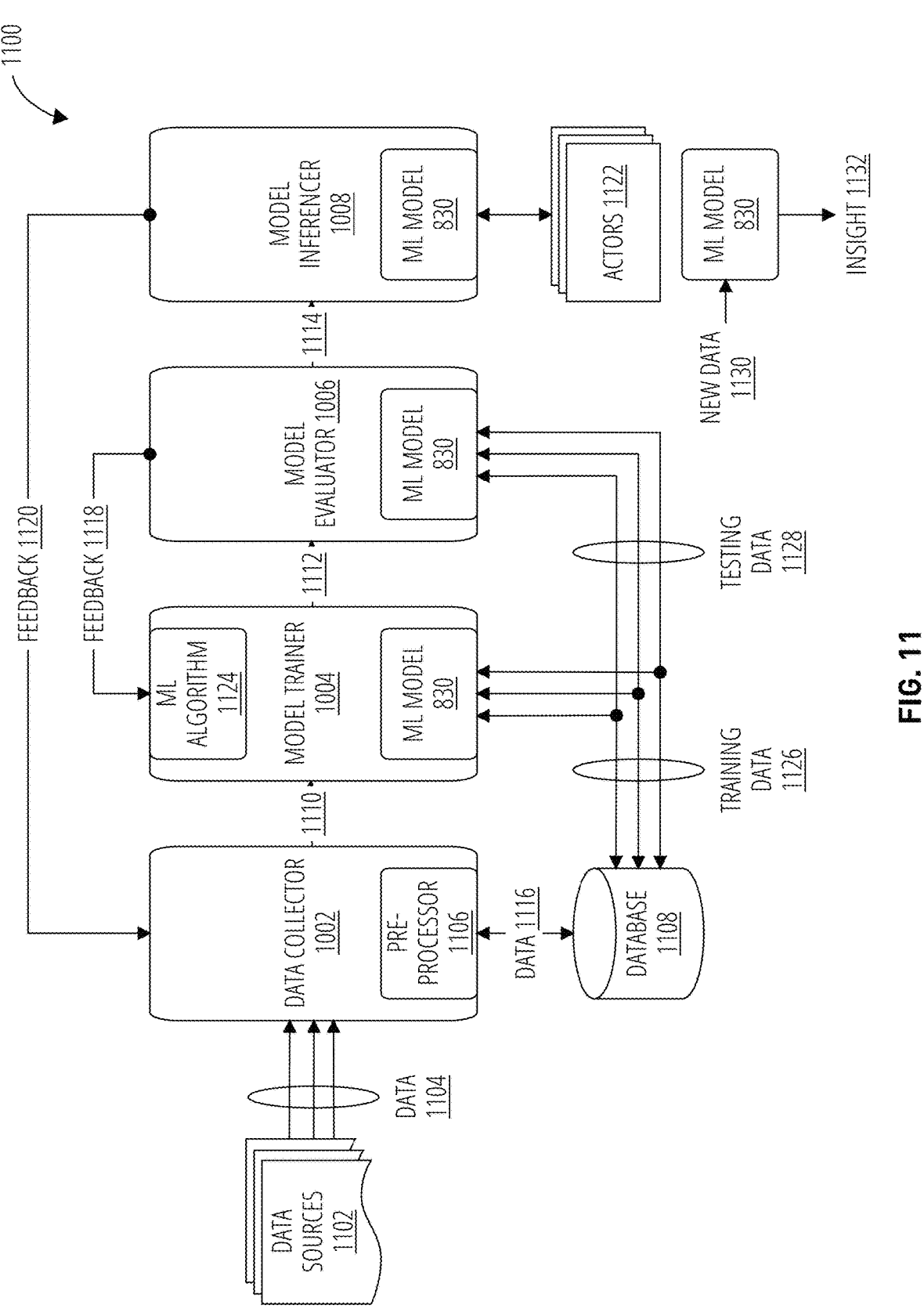
FIG. 11 illustrates an artificial intelligence architecture in accordance with one embodiment.

FIG. 11 illustrates an artificial intelligence architecture 1100 suitable for use by the training device 1014 to generate the ML model 830 for deployment by the inferencing device 804. The artificial intelligence architecture 1100 is an example of a system suitable for implementing various AI techniques and/or ML techniques to perform various inferencing tasks on behalf of the various devices of the system 800.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 1100 includes various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 830, evaluate performance of the trained ML model 830, and deploy the tested ML model 830 as the trained ML model 830 in a production environment, and continuously monitor and maintain it.

The ML model 830 is a mathematical construct used to predict outcomes based on a set of input data. The ML model 830 is trained using large volumes of training data 1126, and it can recognize patterns and trends in the training data 1126 to make accurate predictions. The ML model 830 is derived from an ML algorithm 1124 (e.g., a neural network, decision tree, support vector machine, etc.). A data set is fed into the ML algorithm 1124 which trains an ML model 830 to "learn" a function that produces mappings between a set of inputs and a set of outputs with a reasonably high accuracy. Given a sufficiently large enough set of inputs and outputs, the ML algorithm 1124 finds the function for a given task. This function may even be able to produce the correct output for input that it has not seen during training. A data scientist prepares the mappings, selects and tunes the ML algorithm 1124, and evaluates the resulting model performance. Once the ML logic 828 is sufficiently accurate on test data, it can be deployed for production use.

The ML algorithm 1124 may comprise any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 1124 of the artificial intelligence architecture 1100 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 11, the artificial intelligence architecture 1100 includes a set of data sources 1102 to source data 1104 for the artificial intelligence architecture 1100. Data sources 1102 may comprise any device capable generating, processing, storing or managing data 1104 suitable for a ML system. Examples of data sources 1102 include without limitation databases, web scraping, sensors and Internet of Things (IoT) devices, image and video cameras, audio devices, text generators, publicly available databases, private databases, and many other data sources 1102. The data sources 1102 may be remote from the artificial intelligence architecture 1100 and accessed via a network, local to the artificial intelligence architecture 1100 an accessed via a network interface, or may be a combination of local and remote data sources 1102.

The data sources 1102 source difference types of data 1104. By way of example and not limitation, the data 1104 includes structured data from relational databases, such as customer profiles, transaction histories, or product inventories. The data 1104 includes unstructured data from websites such as customer reviews, news articles, social media posts, or product specifications. The data 1104 includes data from temperature sensors, motion detectors, and smart home appliances. The data 1104 includes image data from medical images, security footage, or satellite images. The data 1104 includes audio data from speech recognition, music recognition, or call centers. The data 1104 includes text data from emails, chat logs, customer feedback, news articles or social media posts. The data 1104 includes publicly available datasets such as those from government agencies, academic institutions, or research organizations. These are just a few examples of the many sources of data that can be used for ML systems. It is important to note that the quality and quantity of the data is critical for the success of a machine learning project.

The data 1104 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 1102 are communicatively coupled to a data collector 1002. The data collector 1002 gathers relevant data 1104 from the data sources 1102. Once collected, the data collector 1002 may use a pre-processor 1106 to make the data 1104 suitable for analysis. This involves data cleaning, transformation, and feature engineering. Data pre-processing is a critical step in ML as it directly impacts the accuracy and effectiveness of the ML model 830. The pre-processor 1106 receives the data 1104 as input, processes the data 1104, and outputs pre-processed data 1116 for storage in a database 1108. Examples for the database 1108 includes a hard drive, solid state storage, and/or random access memory (RAM).

The data collector 1002 is communicatively coupled to a model trainer 1004. The model trainer 1004 performs AI/ML model training, validation, and testing which may generate model performance metrics as part of the model testing procedure. The model trainer 1004 receives the pre-processed data 1116 as input 1110 or via the database 1108. The model trainer 1004 implements a suitable ML algorithm 1124 to train an ML model 830 on a set of training data 1126 from the pre-processed data 1116. The training process involves feeding the pre-processed data 1116 into the ML algorithm 1124 to produce or optimize an ML model 830. The training process adjusts its parameters until it achieves an initial level of satisfactory performance.

The model trainer 1004 is communicatively coupled to a model evaluator 1006. After an ML model 830 is trained, the ML model 830 needs to be evaluated to assess its performance. This is done using various metrics such as accuracy, precision, recall, and F1 score. The model trainer 1004 outputs the ML model 830, which is received as input 1110 or from the database 1108. The model evaluator 1006 receives the ML model 830 as input 1112, and it initiates an evaluation process to measure performance of the ML model 830. The evaluation process includes providing feedback 1118 to the model trainer 1004. The model trainer 1004 re-trains the ML model 830 to improve performance in an iterative manner.

The model evaluator 1006 is communicatively coupled to a model inferencer 1008. The model inferencer 1008 provides AI/ML model inference output (e.g., inferences, predictions or decisions). Once the ML model 830 is trained and evaluated, it is deployed in a production environment where it is used to make predictions on new data. The model inferencer 1008 receives the evaluated ML model 830 as input 1114. The model inferencer 1008 uses the evaluated ML model 830 to produce insights or predictions on real data, which is deployed as a final production ML model 830. The inference output of the ML model 830 is use case specific. The model inferencer 1008 also performs model monitoring and maintenance, which involves continuously monitoring performance of the ML model 830 in the production environment and making any necessary updates or modifications to maintain its accuracy and effectiveness. The model inferencer 1008 provides feedback 1118 to the data collector 1002 to train or re-train the ML model 830. The feedback 1118 includes model performance feedback information, which is used for monitoring and improving performance of the ML model 830.

Some or all of the model inferencer 1008 is implemented by various actors 1122 in the artificial intelligence architecture 1100, including the ML model 830 of the inferencing device 804, for example. The actors 1122 use the deployed ML model 830 on new data to make inferences or predictions for a given task, and output an insight 1132. The actors 1122 implement the model inferencer 1008 locally, or remotely receives outputs from the model inferencer 1008 in a distributed computing manner. The actors 1122 trigger actions directed to other entities or to itself. The actors 1122 provide feedback 1120 to the data collector 1002 via the model inferencer 1008. The feedback 1120 comprise data needed to derive training data, inference data or to monitor the performance of the ML model 830 and its impact to the network through updating of key performance indicators (KPIs) and performance counters.

As previously described with reference to FIGS. 1, 2, the systems 800, 1000 implement some or all of the artificial intelligence architecture 1100 to support various use cases and solutions for various AI/ML tasks. In various embodiments, the training device 1014 of the apparatus 1000 uses the artificial intelligence architecture 1100 to generate and train the ML model 830 for use by the inferencing device 804 for the system 800. In one embodiment, for example, the training device 1014 may train the ML model 830 as a neural network, as described in more detail with reference to FIG. 12. Other use cases and solutions for AI/ML are possible as well, and embodiments are not limited in this context.

Figure 12:
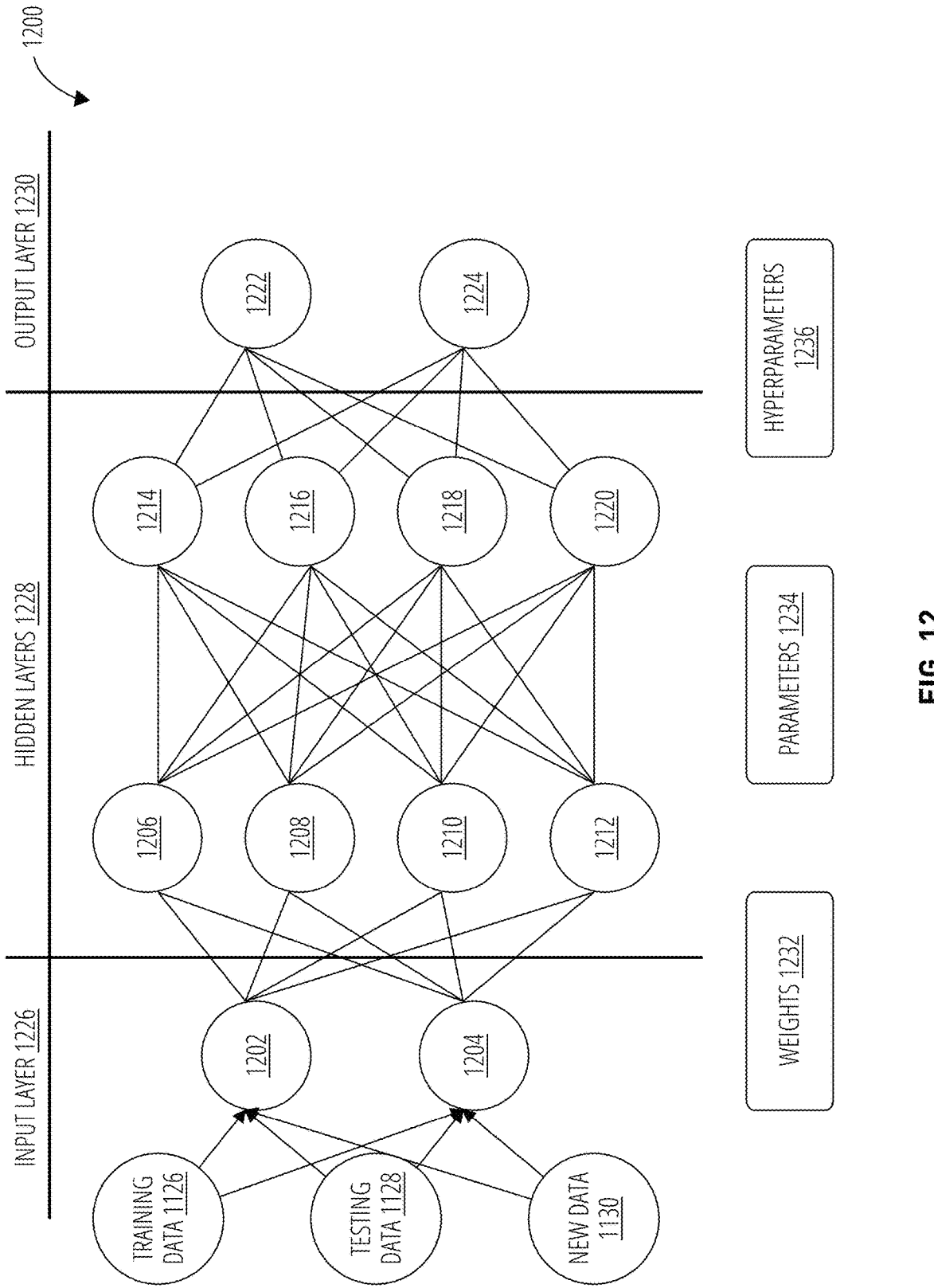
FIG. 12 illustrates an artificial neural network in accordance with one embodiment.

FIG. 12 illustrates an embodiment of an artificial neural network 1200. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 1200 comprises multiple node layers, containing an input layer 1226, one or more hidden layers 1228, and an output layer 1230. Each layer comprises one or more nodes, such as nodes 1202 to 1224. As depicted in FIG. 12, for example, the input layer 1226 has nodes 1202, 1204. The artificial neural network 1200 has two hidden layers 1228, with a first hidden layer having nodes 1206, 1208, 1210 and 1212, and a second hidden layer having nodes 1214, 1216, 1218 and 1220. The artificial neural network 1200 has an output layer 1230 with nodes 1222, 1224. Each node 1202 to 1224 comprises a processing element (PE), or artificial neuron, that connects to another and has an associated weight and threshold. If the output of any individual node is above the specified threshold value, that node is activated, sending data to the next layer of the network. Otherwise, no data is passed along to the next layer of the network.

In general, artificial neural network 1200 relies on training data 1126 to learn and improve accuracy over time. However, once the artificial neural network 1200 is fine-tuned for accuracy, and tested on testing data 1128, the artificial neural network 1200 is ready to classify and cluster new data 1130 at a high velocity. Tasks in speech recognition or image recognition can take minutes versus hours when compared to the manual identification by human experts.

Each individual node 1202 to 424 is a linear regression model, composed of input data, weights, a bias (or threshold), and an output. The linear regression model may have a formula similar to Equation (1), as follows:

$$\sum wixi + \text{bias} = w1x1 + w2x2 + w3x3 + \text{bias} \qquad \text{EQUATION (1)}$$

$$\text{output} = f(x) = 1 \text{ if } \sum w1x1 + b > = 0;\ 0 \sum w1x1 + b < 0$$

Once an input layer 1226 is determined, a set of weights 1232 are assigned. The weights 1232 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 1200 as a feedforward network.

In one embodiment, the artificial neural network 1200 leverages sigmoid neurons, which are distinguished by having values between 0 and 1. Since the artificial neural network 1200 behaves similarly to a decision tree, cascading data from one node to another, having x values between 0 and 1 will reduce the impact of any given change of a single variable on the output of any given node, and subsequently, the output of the artificial neural network 1200.

The artificial neural network 1200 has many practical use cases, like image recognition, speech recognition, text recognition or classification. The artificial neural network 1200 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \rightarrow \text{MIN} \qquad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 1234 of the model adjust to gradually converge at the minimum.

In one embodiment, the artificial neural network 1200 is feedforward, meaning it flows in one direction only, from input to output. In one embodiment, the artificial neural network 1200 uses backpropagation. Backpropagation is when the artificial neural network 1200 moves in the opposite direction from output to input. Backpropagation allows calculation and attribution of errors associated with each neuron 1202 to 1224, thereby allowing adjustment to fit the parameters 1234 of the ML model 830 appropriately.

The artificial neural network 1200 is implemented as different neural networks depending on a given task. Neural networks are classified into different types, which are used for different purposes. In one embodiment, the artificial neural network 1200 is implemented as a feedforward neural network, or multi-layer perceptrons (MLPs), comprised of an input layer 1226, hidden layers 1228, and an output layer 1230. While these neural networks are also commonly referred to as MLPs, they are actually comprised of sigmoid neurons, not perceptrons, as most real-world problems are nonlinear. Trained data 1104 usually is fed into these models to train them, and they are the foundation for computer vision, natural language processing, and other neural networks. In one embodiment, the artificial neural network 1200 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 1200 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 1200 is implemented as any type of neural network suitable for a given operational task of system 800, and the MLP, CNN, and RNN are merely a few examples. Embodiments are not limited in this context.

The artificial neural network 1200 includes a set of associated parameters 1234. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some cases, the artificial neural network 1200 is implemented as a deep learning neural network. The term deep learning neural network refers to a depth of layers in a given neural network. A neural network that has more than three layers—which would be inclusive of the inputs and the output—can be considered a deep learning algorithm. A neural network that only has two or three layers, however, may be referred to as a basic neural network. A deep learning neural network may tune and optimize one or more hyperparameters 1236. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

FIG. 13 illustrates an apparatus 1300. Apparatus 1300 comprises any non-transitory computer-readable storage medium 1302 or machine-readable storage medium, such as an optical, magnetic or semiconductor storage medium. In various embodiments, apparatus 1300 comprises an article of manufacture or a product. In some embodiments, the computer-readable storage medium 1302 stores computer executable instructions with which one or more processing devices or processing circuitry can execute. For example, computer executable instructions 1304 includes instructions to implement operations described with respect to any logic flows described herein. Examples of computer-readable storage medium 1302 or machine-readable storage medium include any tangible media capable of storing electronic data, including volatile memory or non-volatile memory, removable or non-removable memory, erasable or non-erasable memory, writeable or re-writeable memory, and so forth. Examples of computer executable instructions 1304 include any suitable type of code, such as source code, compiled code, interpreted code, executable code, static code, dynamic code, object-oriented code, visual code, and the like.

FIG. 14 illustrates an embodiment of a computing architecture 1400. Computing architecture 1400 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1400 has a single processor with one core or more than one processor. Note that the term "processor" refers to a processor with a single core or a processor package with multiple processor cores. In at least one embodiment, the computing architecture 1400 is representative of the components of the system 800. More generally, the computing architecture 1400 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1400. For example, a component is, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server are a component. One or more components reside within a process and/or thread of execution, and a component is localized on one computer and/or distributed between two or more computers. Further, components are communicatively coupled to each other by various types of communications media to coordinate operations. The coordination involves the uni-directional or bi-directional exchange of information. For instance, the components communicate information in the form of signals communicated over the communications media. The information is implemented as signals allocated to various signal lines. In such allocations, each message is a signal. Further embodiments, however, alternatively employ data messages. Such data messages may be sent across various connections. Exemplary connections include parallel interfaces, serial interfaces, and bus interfaces.

As shown in FIG. 14, computing architecture 1400 comprises a system-on-chip (SoC) 1402 for mounting platform components. System-on-chip (SoC) 1402 is a point-to-point (P2P) interconnect platform that includes a first processor 1404 and a second processor 1406 coupled via a point-to-point interconnect 1470 such as an Ultra Path Interconnect (UPI). In other embodiments, the computing architecture 1400 is another bus architecture, such as a multi-drop bus. Furthermore, each of processor 1404 and processor 1406 are processor packages with multiple processor cores including core(s) 1408 and core(s) 1410, respectively. While the computing architecture 1400 is an example of a two-socket (2S) platform, other embodiments include more than two sockets or one socket. For example, some embodiments include a four-socket (4S) platform or an eight-socket (8S) platform. Each socket is a mount for a processor and may have a socket identifier. Note that the term platform refers to a motherboard with certain components mounted such as the processor 1404 and chipset 1432. Some platforms include additional components and some platforms include sockets to mount the processors and/or the chipset. Furthermore, some platforms do not have sockets (e.g. SoC, or the like). Although depicted as a SoC 1402, one or more of the components of the SoC 1402 are included in a single die package, a multi-chip module (MCM), a multi-die package, a chiplet, a bridge, and/or an interposer. Therefore, embodiments are not limited to a SoC.

The processor 1404 and processor 1406 are any commercially available processors, including without limitation an Intel® Celeron®, Core®, Core (2) Duo®, Itanium®, Pentium®, Xcon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures are also employed as the processor 1404 and/or processor 1406. Additionally, the processor 1404 need not be identical to processor 1406.

Processor 1404 includes an integrated memory controller (IMC) 1420 and point-to-point (P2P) interface 1424 and P2P interface 1428. Similarly, the processor 1406 includes an IMC 1422 as well as P2P interface 1426 and P2P interface 1430. IMC 1420 and IMC 1422 couple the processor 1404 and processor 1406, respectively, to respective memories (e.g., memory 1416 and memory 1418). Memory 1416 and memory 1418 are portions of the main memory (e.g., a dynamic random-access memory (DRAM)) for the platform such as double data rate type 4 (DDR4) or type 5 (DDR5) synchronous DRAM (SDRAM). In the present embodiment, the memory 1416 and the memory 1418 locally attach to the respective processors (i.e., processor 1404 and processor 1406). In other embodiments, the main memory couple with the processors via a bus and shared memory hub. Processor 1404 includes registers 1412 and processor 1406 includes registers 1414.

Computing architecture 1400 includes chipset 1432 coupled to processor 1404 and processor 1406. Furthermore, chipset 1432 are coupled to storage device 1450, for example, via an interface (I/F) 1438. The I/F 1438 may be, for example, a Peripheral Component Interconnect-enhanced (PCIe) interface, a Compute Express Link® (CXL) interface, or a Universal Chiplet Interconnect Express (UCIe) interface. Storage device 1450 stores instructions executable by circuitry of computing architecture 1400 (e.g., processor 1404, processor 1406, GPU 1448, accelerator 1454, vision processing unit 1456, or the like). For example, storage device 1450 can store instructions for the client device 802, the client device 806, the inferencing device 804, the training device 1014, or the like.

Processor 1404 couples to the chipset 1432 via P2P interface 1428 and P2P 1434 while processor 1406 couples to the chipset 1432 via P2P interface 1430 and P2P 1436. Direct media interface (DMI) 1476 and DMI 1478 couple the P2P interface 1428 and the P2P 1434 and the P2P interface 1430 and P2P 1436, respectively. DMI 1476 and DMI 1478 is a high-speed interconnect that facilitates, e.g., eight Giga Transfers per second (GT/s) such as DMI 3.0. In other embodiments, the processor 1404 and processor 1406 interconnect via a bus.

The chipset 1432 comprises a controller hub such as a platform controller hub (PCH). The chipset 1432 includes a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1432 comprises more than one controller hub such as a chipset with a memory controller hub, a graphics controller hub, and an input/output (I/O) controller hub.

In the depicted example, chipset 1432 couples with a trusted platform module (TPM) 1444 and UEFI, BIOS, FLASH circuitry 1446 via I/F 1442. The TPM 1444 is a dedicated microcontroller designed to secure hardware by integrating cryptographic keys into devices. The UEFI, BIOS, FLASH circuitry 1446 may provide pre-boot code. The I/F 1442 may also be coupled to a network interface circuit (NIC) 1480 for connections off-chip.

Furthermore, chipset 1432 includes the I/F 1438 to couple chipset 1432 with a high-performance graphics engine, such as, graphics processing circuitry or a graphics processing unit (GPU) 1448. In other embodiments, the computing architecture 1400 includes a flexible display interface (FDI) (not shown) between the processor 1404 and/or the processor 1406 and the chipset 1432. The FDI interconnects a graphics processor core in one or more of processor 1404 and/or processor 1406 with the chipset 1432.

The computing architecture 1400 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication is a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network is used to connect computers to each other, to the Internet, and to wired networks (which use IEEE 802.3-related media and functions).

Additionally, accelerator 1454 and/or vision processing unit 1456 are coupled to chipset 1432 via I/F 1438. The accelerator 1454 is representative of any type of accelerator device (e.g., a data streaming accelerator, cryptographic accelerator, cryptographic co-processor, an offload engine, etc.). One example of an accelerator 1454 is the Intel® Data Streaming Accelerator (DSA). The accelerator 1454 is a device including circuitry to accelerate copy operations, data encryption, hash value computation, data comparison operations (including comparison of data in memory 1416 and/or memory 1418), and/or data compression. Examples for the accelerator 1454 include a USB device, PCI device, PCIe device, CXL device, UCIe device, and/or an SPI device. The accelerator 1454 also includes circuitry arranged to execute machine learning (ML) related operations (e.g., training, inference, etc.) for ML models. Generally, the accelerator 1454 is specially designed to perform computationally intensive operations, such as hash value computations, comparison operations, cryptographic operations, and/or compression operations, in a manner that is more efficient than when performed by the processor 1404 or processor 1406. Because the load of the computing architecture 1400 includes hash value computations, comparison operations, cryptographic operations, and/or compression operations, the accelerator 1454 greatly increases performance of the computing architecture 1400 for these operations.

The accelerator 1454 includes one or more dedicated work queues and one or more shared work queues (each not pictured). Generally, a shared work queue is configured to store descriptors submitted by multiple software entities. The software is any type of executable code, such as a process, a thread, an application, a virtual machine, a container, a microservice, etc., that share the accelerator 1454. For example, the accelerator 1454 is shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1454 via a non-posted write (e.g., a deferred memory write (DMWr)). One example of an instruction that atomically submits a work descriptor to the shared work queue of the accelerator 1454 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1454. The dedicated work queue may accept job submissions via commands such as the movdir64b instruction.

Various I/O devices 1460 and display 1452 couple to the bus 1472, along with a bus bridge 1458 which couples the bus 1472 to a second bus 1474 and an I/F 1440 that connects the bus 1472 with the chipset 1432. In one embodiment, the second bus 1474 is a low pin count (LPC) bus. Various input/output (I/O) devices couple to the second bus 1474 including, for example, a keyboard 1462, a mouse 1464 and communication devices 1466.

Furthermore, an audio I/O 1468 couples to second bus 1474. Many of the I/O devices 1460 and communication devices 1466 reside on the system-on-chip (SoC) 1402 while the keyboard 1462 and the mouse 1464 are add-on peripherals. In other embodiments, some or all the I/O devices 1460 and communication devices 1466 are add-on peripherals and do not reside on the system-on-chip (SoC) 1402.

FIG. 15 illustrates a block diagram of an exemplary communications architecture 1500 suitable for implementing various embodiments as previously described. The communications architecture 1500 includes various common communications elements, such as a transmitter, receiver, transceiver, radio, network interface, baseband processor, antenna, amplifiers, filters, power supplies, and so forth. The embodiments, however, are not limited to implementation by the communications architecture 1500.

As shown in FIG. 15, the communications architecture 1500 includes one or more clients 1502 and servers 1504. The clients 1502 and the servers 1504 are operatively connected to one or more respective client data stores 1508 and server data stores 1510 that can be employed to store information local to the respective clients 1502 and servers 1504, such as cookies and/or associated contextual information.

The clients 1502 and the servers 1504 communicate information between each other using a communication framework 1506. The communication framework 1506 implements any well-known communications techniques and protocols. The communication framework 1506 is implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1506 implements various network interfaces arranged to accept, communicate, and connect to a communications network. A network interface is regarded as a specialized form of an input output interface. Network interfaces employ connection protocols including without limitation direct connect, Ethernet (e.g., thick, thin, twisted pair 10/800/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces are used to engage with various communications network types. For example, multiple network interfaces are employed to allow for the communication over broadcast, multicast, and unicast networks. Should processing requirements dictate a greater amount speed and capacity, distributed network controller architectures are similarly employed to pool, load balance, and otherwise increase the communicative bandwidth required by clients 1502 and the servers 1504. A communications network is any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose or it comprises a general purpose computer as selectively activated or reconfigured by a computer program stored in the computer. The procedures presented herein are not inherently related to a particular computer or other apparatus. Various general purpose machines are used with programs written in accordance with the teachings herein, or it proves convenient to construct more specialized apparatus to perform the required method steps. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The following examples pertain to further embodiments, from which numerous permutations and configurations will be apparent.

What is claimed is:

1. A system comprising:

a memory component; and one or more processing devices coupled to the memory component, the one or more processing devices to perform operations comprising:

generating, by a context detection module, context information for a first query of a query session during a first iterative process, the first query comprising multimodal information to request a result from one of a plurality of machine learning models;

modifying, by a query modification module, the first query based on the context information to form a first modified query;

determining, by an intent module, an intent type for the first modified query from multiple intent types generated by a combination of a machine learning model and rule-based logic using the first modified query, the machine learning model trained using one-shot or few-shot learning training samples, and wherein the intent type is an output from the machine learning model that matches an output from the rule-based logic;

selecting, by a routing module, a machine learning model from the plurality of machine learning models based on the intent type; and routing, by the routing module, the first modified query to the selected machine learning model.

2. The system of claim 1, the one or more processing devices to perform operations comprising extracting, by a context extraction module of the context detection module, query context information comprising context information from the first query.

3. The system of claim 1, the one or more processing devices to perform operations comprising:

generating, by the context detection module, context information for a second query of the query session and the first modified query during a second iterative process, the second query comprising multimodal information to request a result from one of the plurality of machine learning models;

modifying, by the query modification module, the second query based the context information to form a second modified query;

determining, by an intent module, an intent type for the second modified query;

selecting, by a routing module, a machine learning model from the plurality of machine learning models based on the intent type; and routing, by the routing module, the second modified query to the selected machine learning model.

4. The system of claim 3, the one or more processing devices to perform operations comprising extracting, by a context extraction module of the context detection module, query context information and modified query context information, the query context information comprising context information from the second query and the modified query context information comprising context information from the first modified query.

5. The system of claim 1, the one or more processing devices to perform operations comprising determining, by an intent inference model of the intent module, the intent type for the first modified query, wherein the intent inference model is the machine learning model trained to predict different intent types.

6. The system of claim 1, the one or more processing devices to perform operations comprising determining, by an intent detector module of the intent module, the intent type of the first modified query, wherein the intent detector module uses a set of intent definitions corresponding to different intent types.

7. The system of claim 1, the one or more processing devices to perform operations comprising determining, by an intent inference model and an intent detector module of the intent module, the intent type for the first modified query, wherein the intent inference model and the intent detector module operate in parallel.

8. The system of claim 1, the one or more processing devices to perform operations comprising determining, by an intent inference model and an intent detector module of the intent module, the intent type for the first modified query, wherein the intent inference model and the intent detector module operate in sequence.

9. A method, comprising:

generating, by a context detection module, query context information for a first query of a query session during a first iterative process, the first query comprising multimodal information to request a result from a first machine learning model;

modifying, by a query modification module, the first query based on the query context information for the first query to form a first modified query;

generating, by the context detection module, query context information for a second query of the query session and modified query context information for the first modified query during a second iterative process, the second query comprising multimodal information to request a result from a second machine learning model;

modifying, by the query modification module, the second query based on the query context information for the second query and the modified query context information for the first modified query to form a second modified query, wherein the second modified query comprises a recursive summary of the query context information for the first query, the modified query context information for the first modified query, and the query context information for the second query; and routing, by a routing module, the first modified query to the first machine learning model and the second modified query to the second machine learning model.

10. The method of claim 9, wherein the multimodal information comprises natural language text information, further comprising extracting, by a context extraction module of the context detection module, the query context information from natural language text information of the first query during the first iterative process.

11. The method of claim 9, wherein the multimodal information comprises natural language text information, further comprising extracting, by a context extraction module of the context detection module, the query context information from natural language text information of the second query and the modified query context information from natural language text information of the first modified query during the second iterative process.

12. A system comprising:

a memory component; and one or more processing devices coupled to the memory component, the one or more processing devices to perform operations comprising:

generating, by a context detection module, context information for a query comprising natural language information to request a result from one of a plurality of machine learning models;

determining, by an intent module, an intent type for the query from multiple intent types generated by a combination of a machine learning model and rule-based logic, the machine learning model trained using one-shot or few-shot learning training samples, and wherein the intent type is an output from the machine learning model that matches an output from the rule-based logic;

selecting, by a routing module, a machine learning model from the plurality of machine learning models based on the intent type; and routing, by the routing module, the query to the selected machine learning model.

13. The system of claim 12, the one or more processing devices to perform operations comprising determining, by an intent inference model of the intent module, the intent type for the query, wherein the intent inference model is the machine learning model trained to predict different intent types.

14. The system of claim 12, the one or more processing devices to perform operations comprising determining, by an intent detector module of the intent module, the intent type of the query, wherein the intent detector module uses a set of intent definitions corresponding to different intent types.

15. The system of claim 12, the one or more processing devices to perform operations comprising:

determining, by an intent inference model of the intent module, a first intent type for the query;

determining, by an intent detector module of the intent module, a second intent type for the query;

comparing, by the intent module, the first intent type and the second intent type; and determining, by the intent module, the intent type for the query when the first intent type matches the second intent type.

16. The system of claim 12, the one or more processing devices to perform operations comprising determining, by an intent inference model and an intent detector module of the intent module, the intent type for the query, wherein the intent inference model and the intent detector module operate in parallel.

17. The system of claim 12, the one or more processing devices to perform operations comprising determining, by an intent inference model and an intent detector module of the intent module, the intent type for the query, wherein the intent inference model and the intent detector module operate in sequence.

18. The system of claim 12, wherein the intent type comprises visualization, forecasting, anomaly detection, data question and answer, breakdown dimension, segment creation, or summary captioning.

\* \* \* \* \*